United States Patent [19]
Williams et al.

[11] Patent Number: 5,741,542
[45] Date of Patent: Apr. 21, 1998

[54] PROCESS OF MAKING THERMAL FREE-RADICAL CURE ADHESIVES

[75] Inventors: Jerry W. Williams, Cottage Grove; Gary T. Boyd; Jeanne M. Goetzke, both of Woodbury; Gerald L. Uhl, St. Paul; David A. Ylitalo, Stillwater, all of Minn.

[73] Assignee: Minnesota Mining & Manufacturing Company, St. Paul, Minn.

[21] Appl. No.: 444,819

[22] Filed: May 18, 1995

Related U.S. Application Data

[63] Continuation of Ser. No. 234,468, Apr. 28, 1994, abandoned.
[51] Int. Cl.$^6$ .................................................. B05D 5/10
[52] U.S. Cl. ............................ 427/208.4; 427/207.1; 427/208.8; 427/385.5; 427/407.1
[58] Field of Search ............... 427/207.1, 208.4, 427/208.8, 385.5, 407.1

[56] References Cited

U.S. PATENT DOCUMENTS

| | | | |
|---|---|---|---|
| Re. 24,906 | 12/1960 | Ulrich | 206/59 |
| 3,615,972 | 10/1971 | Morehouse, Jr. et al. | 156/79 |
| 3,829,340 | 8/1974 | Dembiak et al. | 156/201 |
| 3,897,295 | 7/1975 | Dowbenko et al. | 156/272 |
| 4,075,238 | 2/1978 | Mark et al. | 260/458 |
| 4,181,752 | 1/1980 | Martens et al. | 427/54.1 |
| 4,287,308 | 9/1981 | Nakayama et al. | 521/53 |
| 4,415,615 | 11/1983 | Esmay et al. | 428/40 |
| 4,513,039 | 4/1985 | Esmay | 428/40 |
| 4,710,536 | 12/1987 | Klingen et al. | 524/493 |
| 4,749,590 | 6/1988 | Klingen et al. | 427/54.1 |
| 4,975,300 | 12/1990 | Deviny | 427/54.1 |

FOREIGN PATENT DOCUMENTS

| | | | |
|---|---|---|---|
| 4-41576 | 2/1992 | Japan . | |
| 2032938 | 5/1980 | United Kingdom | C09D 3/80 |
| 2109798 | 6/1983 | United Kingdom | C09J 5/06 |
| WO 84/03837 | 10/1984 | WIPO . | |

OTHER PUBLICATIONS

"Principles of Polymerization", Odian 3rd ed., Wiley & Sons, Inc. 1991, pp. 198–274 (No Month avail.).
"Principles of Heat Transfer", Kreith, 4th ed. Harper & Row, 1986, Chapters 1, 6–9 (No Month Avail.).
"Macromolecules", 1983, vol. 16, p. 348ff (No Month Avail.).

*Primary Examiner*—Bernard Pianalto
*Attorney, Agent, or Firm*—Carolyn V. Peters

[57] ABSTRACT

A process for making an adhesive comprising allowing a carrier web coated with a thermal free-radically polymerizable mixture to remain in a heat exchange medium for a time sufficient to subdue the reaction exotherm and maintain a reaction temperature by thermal contact of the polymerizable mixture with the heat exchange medium and to affect conversion of the coating to an adhesive layer, preferably to a pressure sensitive adhesive layer, wherein the coating is a substantially solvent-free thermally initiated polymerizable mixture comprised of at least one free radical monomer, at least one thermal initiator, optionally, at least one cross-linker and optionally, at least one co-monomer.

24 Claims, 10 Drawing Sheets

PROCESS OF MAKING THERMAL FREE-RADICAL CURE ADHESIVES

This is a continuation of application Ser. No. 08/234,468 filed Apr. 28, 1994, abandoned.

TECHNICAL FIELD

This invention relates to a process for the production of pressure sensitive adhesives and more particularly, it relates to thermal free-radical cure of adhesives. It also relates to acrylic-based adhesives and tapes made by the novel processes of this invention.

BACKGROUND OF THE INVENTION

Polymeric materials based on acrylic monomers are known in the art, including those whose primary use is for pressure sensitive adhesives (for example, U.S. Reissue Pat. No. 24,906). PSAs are typically copolymers of a major proportion of alkyl esters of acrylic acid and a minor portion of at least one modifying monomer, such as (meth)acrylic acid, (meth)acrylamide, (meth)acrylonitrile and the like. Acrylate-based polymers are widely used as adhesives in industry for reasons of costs, raw material availability, ease of reaction and properties.

However, some acrylate monomers are highly volatile and require expensive equipment. For example, methyl acrylate is a highly volatile monomer and using such a monomer in an adhesive formulation requires the use of coating equipment that is certified as Class 1, Division 2, Group D for use with flammable volatile materials as designated by the U.S. National Electric Code. Coaters of this type tend to be very expensive and hazardous to operate. A number of polymerization methods have been used, but few, if any deal adequately with the problems of highly volatile monomers.

It is known in the literature and in the industry that there are at least five different feasible methods for the production of acrylic-based pressure-sensitive adhesives (hereinafter "PSAs"). These known methods include solution polymerization, emulsion polymerization, suspension polymerization, irradiation by high energy particulate matter (for example, electron beams or gamma rays), and ultraviolet light (hereinafter "UV") photopolymerization. As explained below, there are disadvantages and/or limitations incurred with the use of each known process.

Solution polymerization is used because it is relatively easy to control the significant reaction exotherm characteristically associated with acrylate polymerization. However, elaborate drying ovens with massive exhaust ducts and high temperatures are required to carry away the volatile organic compounds (hereinafter "VOCs") after coating from solution. Furthermore, to prevent the VOCs from being vented to the atmosphere (with resulting pollution and solvent loss), expensive VOC recovery equipment is necessary. Safety hazards in such operations are also significant, as the VOCs are extremely flammable and precautions must be taken to avoid explosive mixtures in the oven and recovery systems. Further, coatings applied from solution have a limitation as to the thickness of the coating that can be deposited in one pass through the coater. Thus, with coatings above about 0.125 mm, multiple coating layers must be deposited in successive trips through the coater to avoid blistering of the coating due to solvent evaporation.

While emulsion and suspension polymerizations have minimized the problems associated with the handling and evaporation of flammable solvents, heat must be supplied to remove water from the coating and essentially the same equipment must be employed. Though high solids coatings are possible, the higher heat of vaporization of water as compared to VOCs offsets this benefit and about the same total energy for drying is required. Drying times are relatively long, thus limiting production rate. One of the most serious limitations of the emulsion polymerization process is the water sensitivity of the resulting polymers (caused by the emulsifying agent, which is carried along in the process and becomes part of the final adhesive). A further limitation of this process is that highly polar monomers, which are water miscible, are difficult to incorporate into the copolymer during polymerization and considerable homopolymerization of such monomers can occur in the aqueous phase.

More recently, development work has been done with polymerization processes that employ either ultraviolet light or electron beams. One which stresses electron beam curing is U.S. Pat. No. 3,897,295, in which the composition subject to the electron beam includes an acrylate monomer selected from a particular specific group, and a homopolymer or copolymer of a substance or substances selected from the same group. The polymer is dissolved in the monomer and the monomer is ultimately polymerized to bind the adhesive together.

The disadvantage of using polymerization processes involving an electron beam, though, is that, generally, it is a rather indiscriminate polymerization process. In polymerization processes using an electron beam, the particulate bombardment of the polymerizable mixture can lead to chain scission of the developing polymer, resulting in an inability to control the molecular weight of the polymer and the crosslink density into the most desired range.

In order to avoid the above-discussed disadvantages incurred with the use of an electron beam, some have chosen to use a one step low-intensity (for example, 0.1 to 7 mW/cm$^2$) UV photopolymerization process. See, for example, U.S. Pat. No. 4,181,752. Whereas the use of relatively low intensity UV light is very desirable for building higher molecular weight acrylic PSA's with good performance properties, the use of low intensity UV light leads to low manufacturing rates, so an increase in the speed of the photopolymerization process would be desirable. However, if one attempts to increase the speed of the low intensity UV light-based process by increasing the amount of the photoinitiator employed (for example, benzoin ethers, benzil ketals, etc.), undesirable lower molecular weight polymers will be obtained.

Furthermore, for thick adhesives an uneven polymerization from the front surface to the back surface of an irradiated adhesive composition occurs due to absorption of the UV radiation by the polymerizable mixture through the thickness of the coating. This results in a gradient in the conversion, molecular weight and distribution through the thickness of the cured material, which can lead to inferior performance of the final PSA product. In addition to the above discussed considerations, UV light-based processes generally require rigorous exclusion of oxygen during the polymerization process and are limited to essentially non-volatile acrylic monomers and to constructions that are substantially transparent to UV irradiation. Furthermore, controlling the polymerization reaction exotherm is still necessary.

A number of modifications and variations of the UV light-based processes are known. (See for example, U.S. Pat. Nos. 4,415,615 and 4,513,039). For example, a pressure sensitive adhesive composition is prepared by coating the polymerization mixture onto a web and polymerizing via UV irradiation, wherein the polymerization step is carried out in an inert atmosphere (Japanese Kokai No. HEI 5-5014). Alternatively, the UV light polymerization step is carried out while the coated web is immersed in water (Japanese Kokai No. HEI 4-41576).

In view of the foregoing discussed disadvantages and limitations that exist with the use of conventional polymerization processes, improvements are continuously desired and sought by those within the industry. It was against this background that an improved polymerization process for producing adhesives, and in particular acrylic-based adhesives and tapes was sought.

SUMMARY OF THE INVENTION

By the present invention, it has been discovered that a controlled thermal polymerization process for the production of adhesives and adhesive-coated tapes with acceptable product properties can be achieved by using a thermal polymerization step conducted in conjunction with a thermal buffer comprising a heat transfer process that features a relatively high heat transfer coefficient, such as forced convection using flowing water. Preferably, the adhesives are acrylic-based, which exhibit particularly troublesome, and at times, process rate limiting polymerization exotherms.

Accordingly, the inventive process for the production of adhesives comprises allowing a carrier web coated with a free-radically polymerizable composition to remain in a thermal buffer for a time sufficient to effect conversion of the coating to an adhesive while controlling the reaction exotherm to maintain a reaction temperature within 20° C. of the temperature of the thermal buffer. The thermal buffer is characterized as a system for heat transfer wherein the heat transfer coefficient is at least 25 W/(m².K). Depending on the particular polymerizable mixture, it may be advantageous to exclude oxygen from the polymerization zone.

The coating on the carrier web can be a substantially solvent-free thermally polymerizable mixture, wherein the polymerizable mixture comprises at least one free-radically polymerizable monomer, at least one thermal initiator and optionally at least one cross-linker. Preferably the coating is such that the polymerized coating is a PSA. Preferably, the free-radically polymerizable monomers are predominantly acrylic-based monomers.

In another embodiment of the present invention, a polymerizable composition is coated between a first and second carrier web to form a sandwich, and then processed as above. Advantageously, there is no need to eliminate oxygen from the polymerization zone.

In yet another embodiment of the present invention, a process for preparing a stack of layers, such as a stack of PSA adhesive tapes in a single processing sequence is provided. Such a process, for example, involves constructing a series of layers by building a new layer atop a previous layer or co-extruding multiple layers or the like.

In still another embodiment of the present invention, acrylic-based adhesive foam and/or opaque (to actinic radiation) tapes are provided, which can be produced by the foregoing disclosed, inventive process.

The inventive thermal polymerization process does not have the limitations and drawbacks discussed earlier associated with solvent or water-based polymerization processes. Advantageously, the inventive process is a solventless, 100% solids process that makes use of readily available free radical initiators. PSA tapes thus produced exhibit peel and shear performance that meet or exceed the specifications of current adhesive, transfer, and foam tapes. Most of the PSA tapes produced according to the present invention exhibit pressure sensitive adhesive behavior at room temperature. Furthermore, thermal polymerization provides the capability of using components and making articles that are opaque to actinic radiation.

Other aspects, advantages and benefits of the present invention are apparent from the detailed description, examples and claims.

As used in the application:

"curing" means conversion of a monomer mixture to a polymeric material;

"polymerization" means a chemical reaction in which monomers are combined chemically to form a polymer;

"adhesive" means any substance that is capable of bonding other substances together by surface attachment;

"pre-heating zone" means a zone wherein a coated construction is heated to a point just before commencement of polymerization of the coating;

"multi-layer" means successive layers, one atop the next, of the polymerizable mixture, with no interposing liner(s);

"stacked" means a layered system in which one or more liner is interposed between each layer of polymerizable mixture;

"liner" or "backing" or "substrate" or "carrier web" mean sheet materials on which or between which the polymerizable mixture is coated;

"thermal buffer" means a system that brings a material within the buffer, such as the coated web, toward the temperature of the buffer and tends to maintain the material within the buffer at a relatively constant temperature;

"conversion" or "converting" means the transformation of starting materials in a chemical reaction into one or more final products; and "syrup" is a polymerizable mixture thickened to a coatable viscosity.

"heat transfer coefficient of the thermal buffer" means the effective heat transfer coefficient for the process of heat transfer that occurs within the buffer from the coated carrier web to the thermal buffer. This heat transfer coefficient can be either a convective heat transfer coefficient, for example when a water bath is used for the thermal buffer, or a conductive heat transfer coefficient, for example when a heated metal roll is used for the thermal buffer.

5(a) represents Conversion versus Time (sec.);

5(b) represents Temperature versus Time (sec.);

5(c) represents Initiator Radical ([I*]) and Initiator ([I]) Concentrations versus Time (sec.);

5(d) represents Polymer Radical (Live Chain) Concentrations versus Time (sec.); and 5(e) represents Number Average Molecular Weight ($M_n$) versus Time (sec.).

FIGS. 6(a), 6(b), 6(c) 6(d) and 6(e) are graphical representations for an isooctyl acrylate/AIBN polymerizable composition thermally polymerized in water based on the calculations and equations set forth in the specification:

6(a) represents Conversion versus Time (sec.);

6(b) represents Temperature versus Time (sec.);

6(c) represents Initiator Radical ([I*]) and Initiator ([I]) Concentrations versus Time (sec.);

6(d) represents Polymer Radical (Live Chain) Concentrations versus Time (sec.); and 6(e) represents Number Average Molecular Weight ($M_n$) versus Time (sec.).

Figure 7:
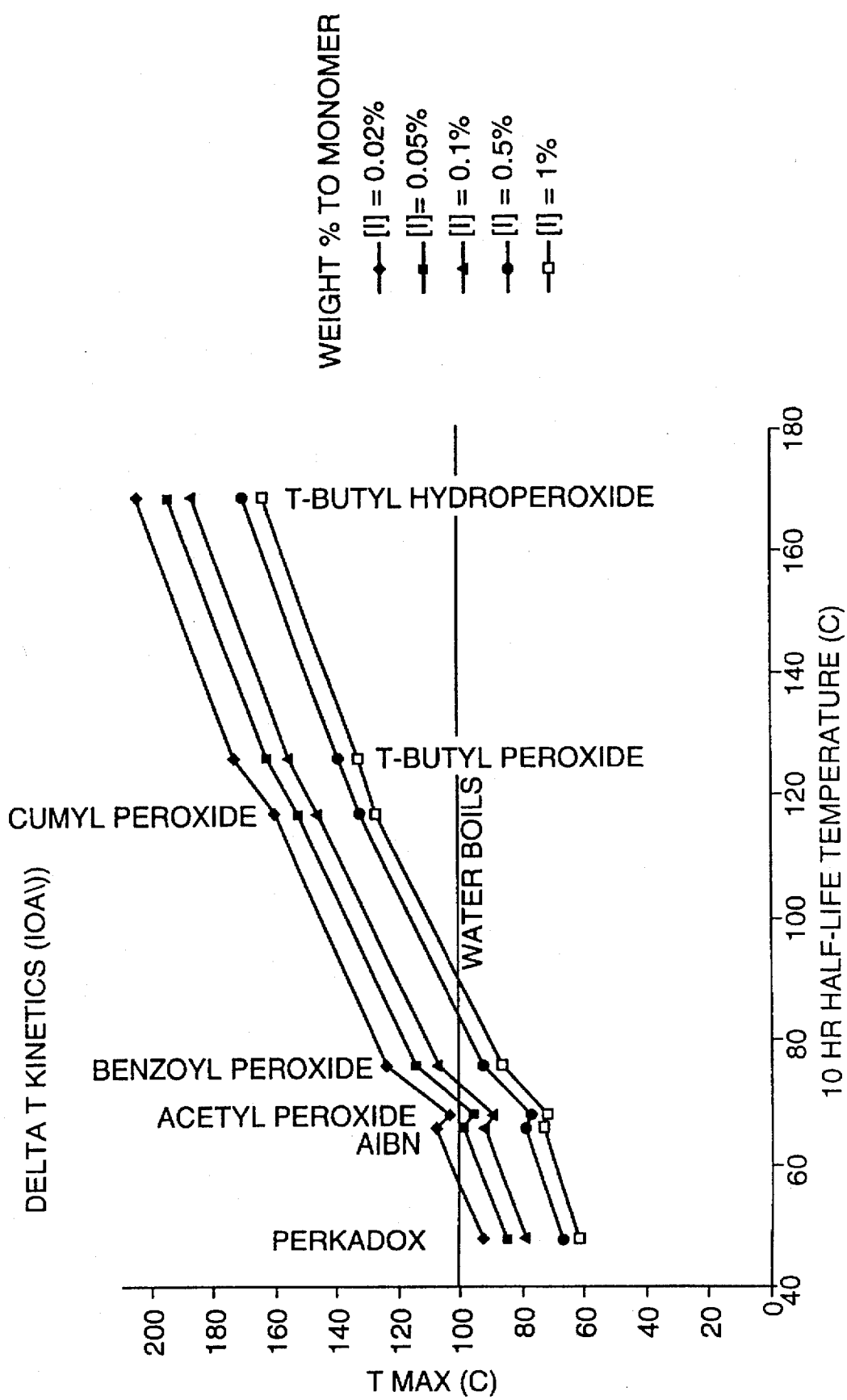

FIG. 7 is a graphical representation of $T_{max}$ (°C.) versus 10 hour half-life temperature ($T_{1/2}$) for various thermal initiators at different percents (%) in isooctyl acrylate based on the calculations and equations set forth in the specification.

Figure 8:
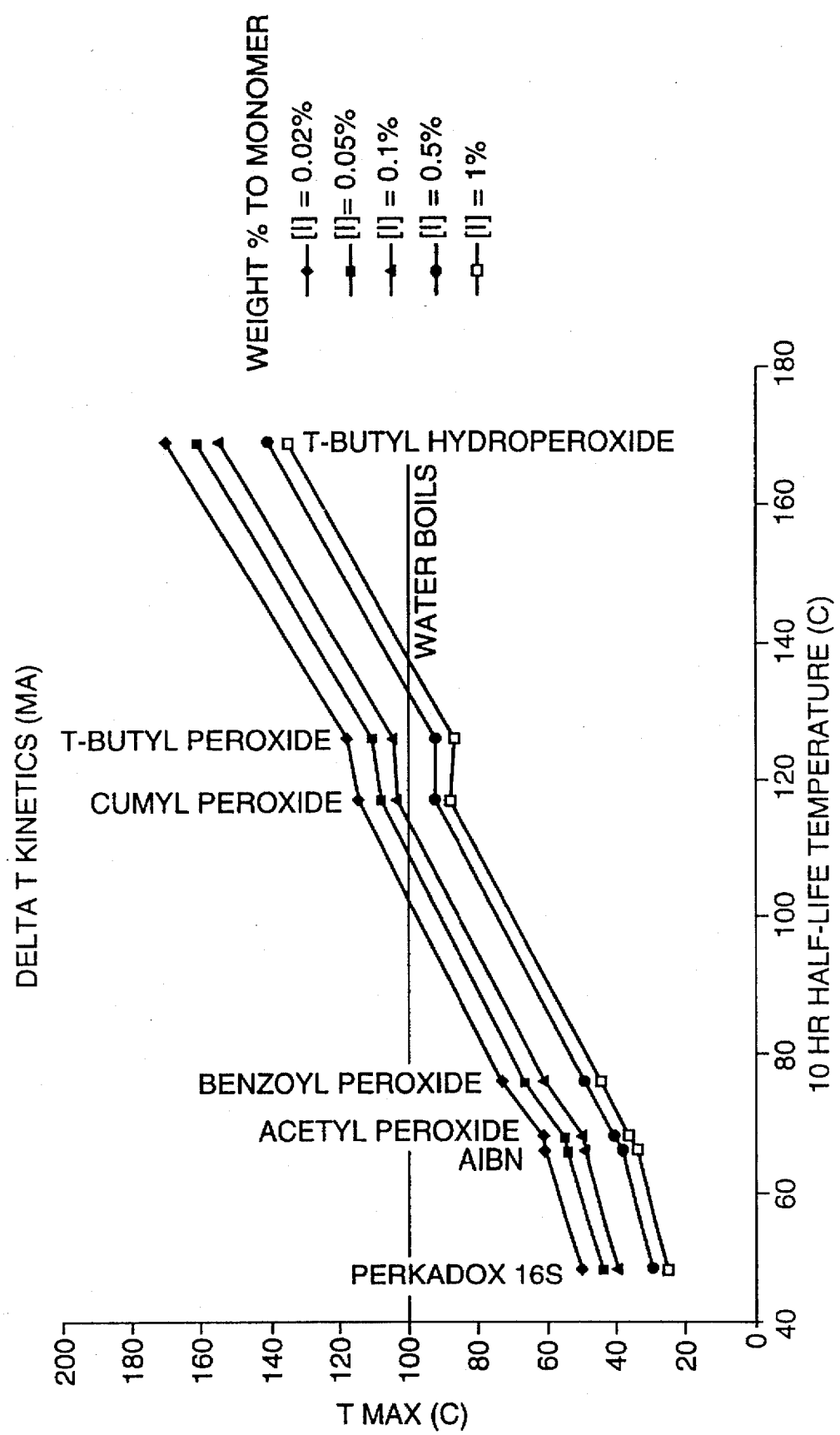

FIG. 8 is a graphical representation of $T_{max}$ (°C.) versus 10 hour half-life temperature ($T_{1/2}$) for various thermal initiators at different % in methyl acrylate based on the calculations and equations set forth in the specification.

Figure 9:
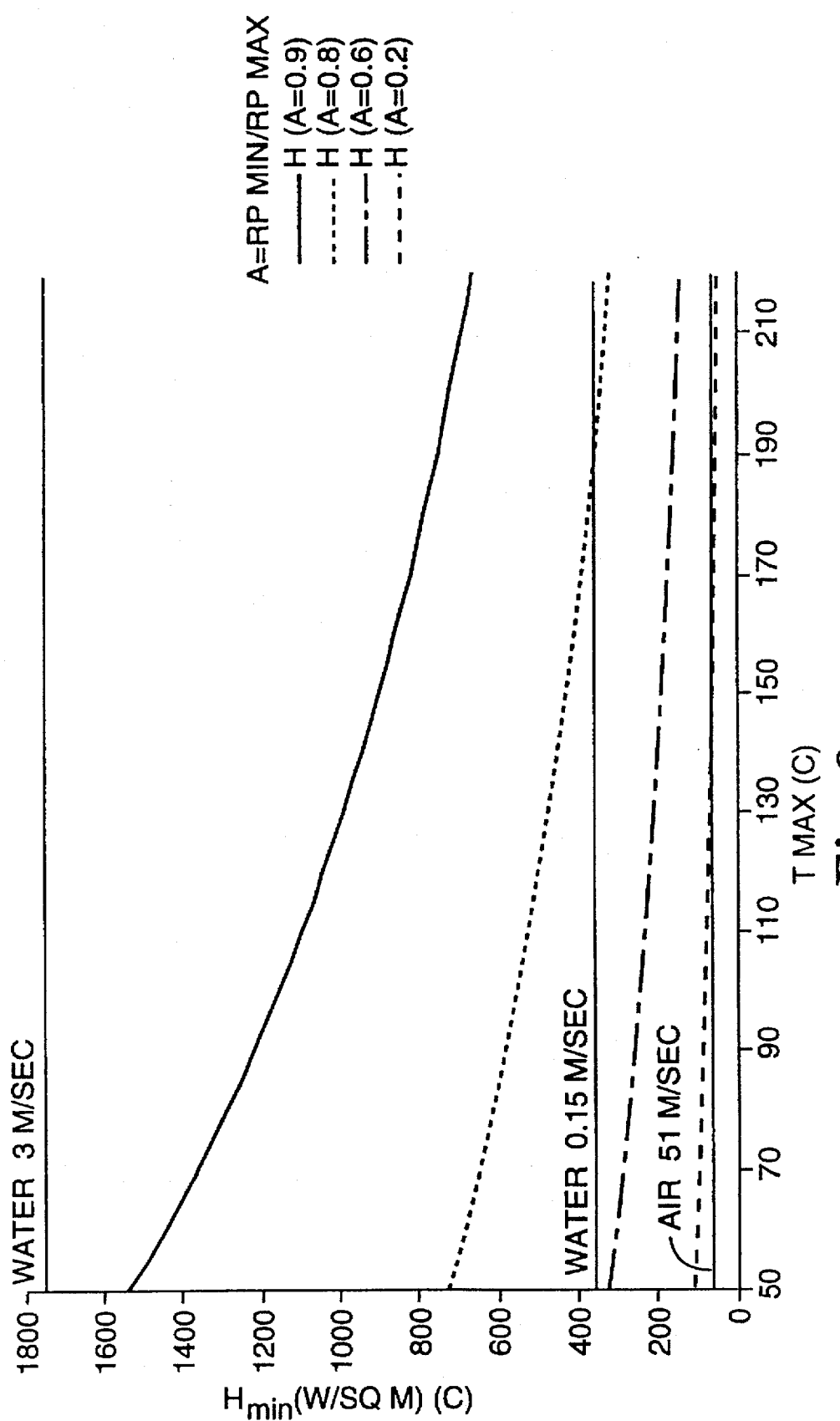
Figure 10:
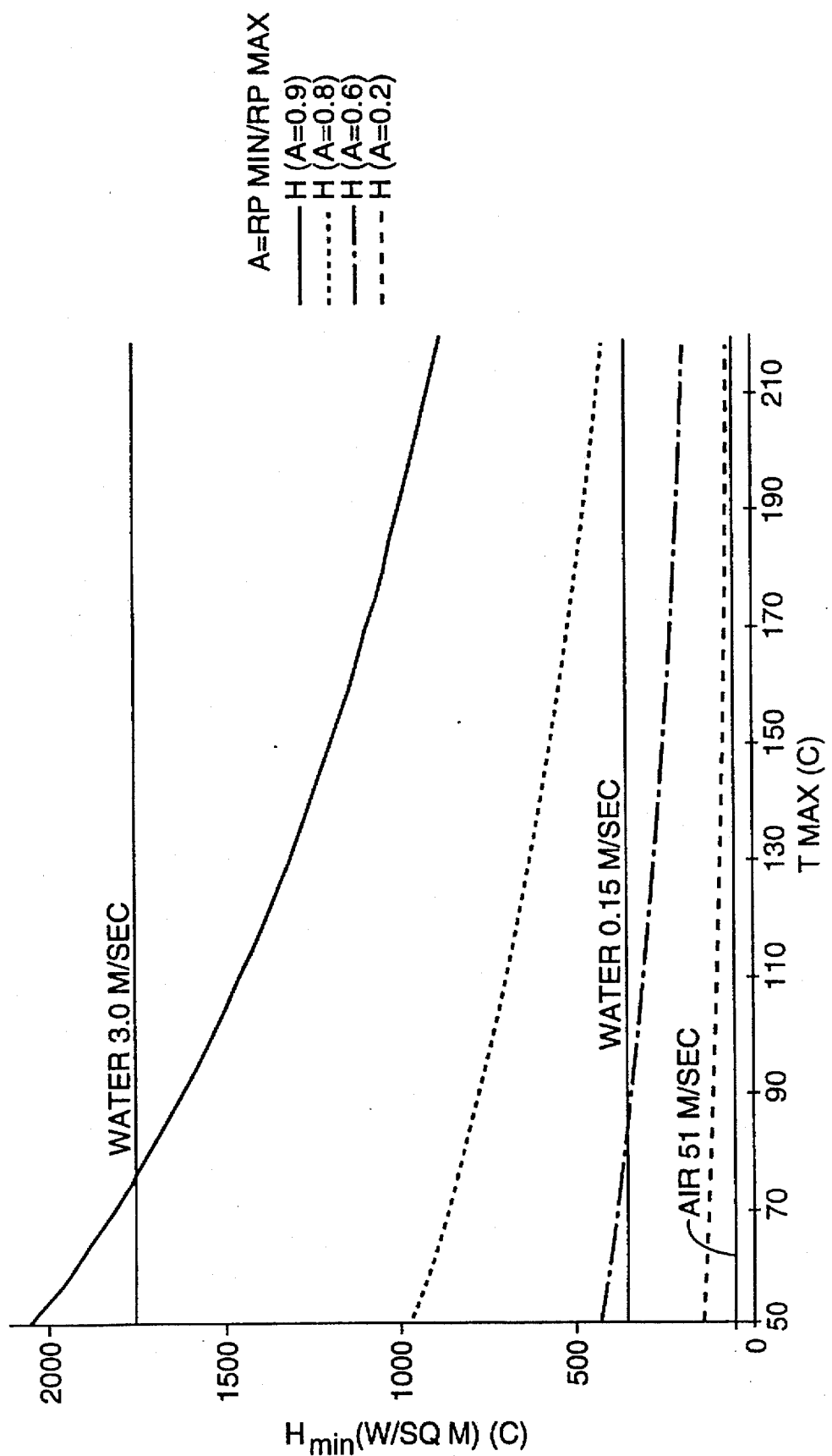

FIG. 9 is a graphical representation of minimum heat transfer coefficient ($h_{min}$ (W/(m$^2$.K))) versus $T_{max}$ (°C.) for a 0.5 mm film using Perkadox™ 16S based on the calculations and equations set forth in the specification FIG. 10 is a graphical representation of minimum heat transfer coefficient ($h_{min}$ (W/(m$^2$.K))) versus $T_{max}$ (°C.) for Dicumyl Peroxide based on the calculations and equations set forth in the specification.

Figure 11:
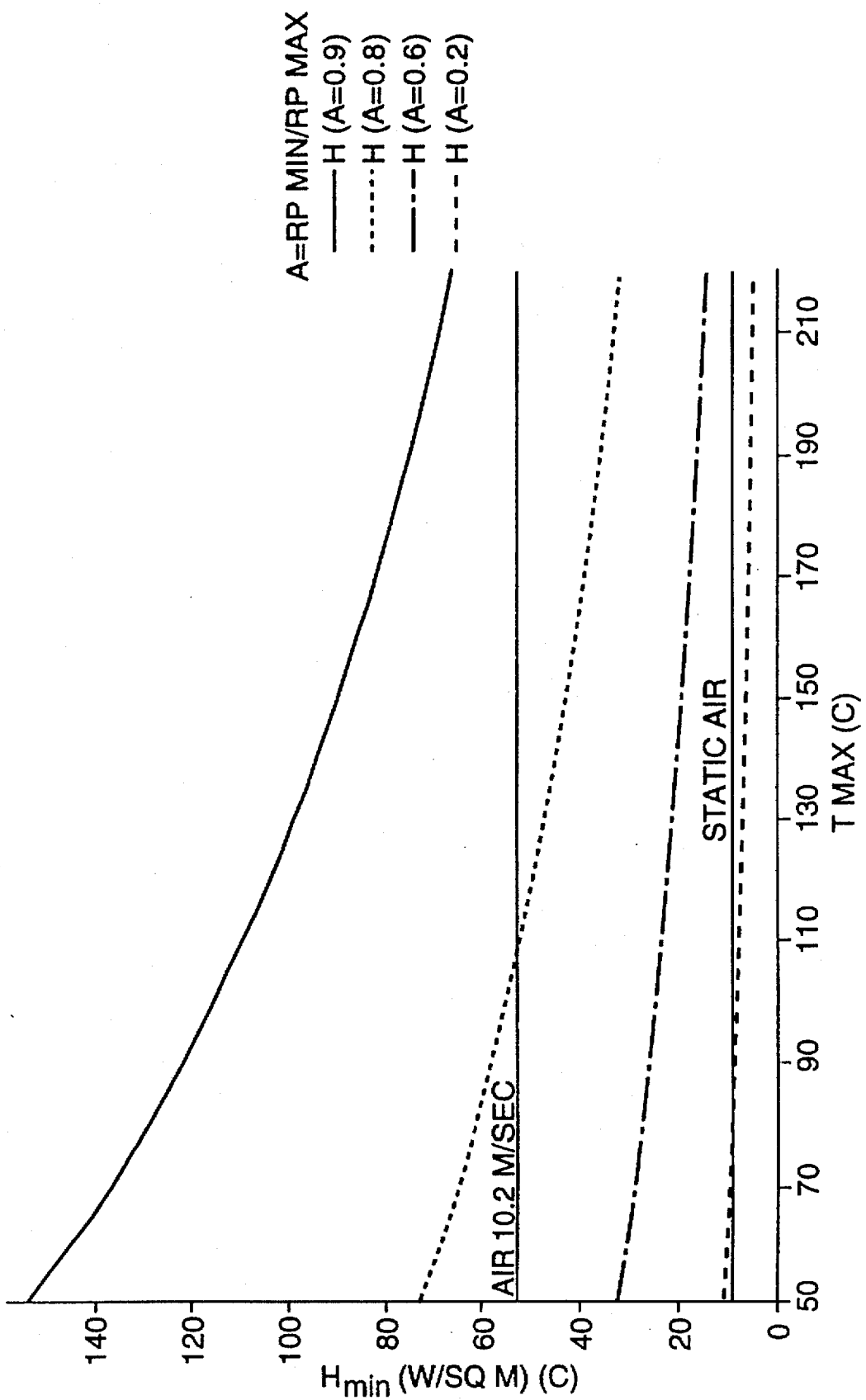

FIG. 11 is a graphical representation of minimum heat transfer coefficient ($h_{min}$ (W/(m$^2$.K))) versus $T_{max}$ (°C.) for a 0.05 mm film using Perkadox™ 16S based on the calculations and equations set forth in the specification.

DESCRIPTION OF THE PREFERRED EMBODIMENT(S)

Polymerizable Mixture

A free-radically polymerizable monomeric mixture or partially prepolymerized syrup can be made by combining one or more of the components described below.

Monomer(s)

The polymerizable monomeric mixture comprises at least one free-radically polymerizable monomer. Examples of such monomers include specifically, but not exclusively, the following classes:

Class A—acrylic acid esters of an alkyl alcohol (preferably a non-tertiary alcohol), the alcohol containing from 1 to 14 (preferably from 4 to 14) carbon atoms and include, for example, methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate, and dodecyl acrylate.

Class B—methacrylic acid esters of an alkyl alcohol (preferably a non-tertiary alcohol), the alcohol containing from 1 to 14 (preferably from 4 to 14) carbon atoms and include, for example, methyl methacrylate, ethyl methacrylate, n-propyl methacrylate, n-butyl methacrylate, isobutyl methacrylate and t-butyl methacrylate.

Class C—(meth)acrylic acid monoesters of polyhydroxy alkyl alcohols such as 1,2-ethanediol, 1,2-propanediol, 1,3-propane diol, the various butyl diols, the various hexanediols, glycerol, etc., such that the resulting esters are referred to as hydroxyalkyl (meth)acrylates.

Class D—multifunctional (meth)acrylate esters, such as 1,4-butanediol diacrylate, 1,6-hexanediol diacrylate, glycerol diacrylate, glycerol triacrylate, and neopentyl glycol diacrylate;

Class E—macromeric (meth)acrylates, such as (meth)acrylate-terminated styrene oligomers and (meth)acrylate-terminated polyethers, such as are described in PCT Patent Application WO 84/03837 and European Patent Application EP 140941;

Class F—acrylic acid and methacrylic acid, and their salts with alkali metals, including, for example, lithium, sodium, and potassium, and their salts with alkaline earth metals, including, for example, magnesium, calcium, strontium, and barium;

Class G—nitrogen-bearing monomers selected from the group consisting of (meth)acrylonitrile, (meth)acrylamide, N-substituted (meth)acrylamides, N,N-disubstituted (meth)acrylamides, the latter of which may include substituents of 5- and 6-membered heterocyclic rings comprising one or more heteroatoms, and methyl-substituted maleonitrile, and N-vinyl lactams, such as N-vinyl pyrrolidinone and N-vinyl caprolactam;

Class H—dibasic acid monomers such as itaconic acid and maleic acid;

Class I—vinyl esters of $C_1$-$C_{20}$ branched or straight-chain substituted or unsubstituted carboxylic acids;

Class J—styrenes and ring-substituted styrenes, such as styrene, vinyl toluene, divinyl benzene and alpha-methyl styrene;

Class K—vinyl halides and vinylidene halides; and

Class L—vinyl ethers, such as vinyl butyl ether, 2-ethylhexyl vinyl ether, and isooctyl vinyl ether.

Preferred Class A, B and C monomers include, respectively, methyl acrylate, ethyl acrylate, n-butyl acrylate, t-butyl acrylate, 2-ethylhexyl acrylate, isooctyl acrylate and isononyl acrylate; methyl methacrylate and ethyl methacrylate; and hydroxyethyl acrylate, 2-hydroxypropyl acrylate, 3-hydroxypropyl acrylate, and 4-hydroxybutyl acrylate.

Preferably, the polymerizable mixture is a mixture of (1) 0–100 parts by weight of one or more Class A monomers, (2) 0-100 parts by weight of one or more of Classes B–I monomers and (3) one or more free-radical, thermal initiator. When a mixture of monomers is used for either one or both of components (1) and (2), each mixture is added in the same amount as if a single class of monomers is used.

Viscosity Modifiers

In a preferred embodiment of the present invention, the viscosity of the polymerizable mixture can be increased to a more desirable level so that it can be handled more conveniently during coating processes. In order to increase the mixture viscosity to a more desirable level, the monomer mixtures can be partially prepolymerized. Prepolymerization can be accomplished by exposure to electromagnetic radiation (such as actinic radiation), by thermal polymerization or a combination thereof. Partial prepolymerization can be accomplished in an inert (nitrogen) atmosphere using a bank of 40-watt fluorescent black lights to provide coatable syrups of a viscosity (Brookfield) of about 1500 cps. However, other methods of increasing the viscosity of the polymerizable mixture are also available, such as the addition of viscosity-modifying agents such as glycerin or high molecular weight polymers, or thixotropic agents such as colloidal silicas and the like.

Polymerization Initiators

Thermal initiators useful in the present invention include, but are not limited to azo, peroxide, persulfate, and redox initiators.

Suitable azo initiators include, but are not limited to 2,2'-azobis(4-methoxy-2,4-dimethylvaleronitrile) (VAZO™ 33); 2,2'-azobis(2-amidinopropane) dihydrochloride ((VAZO™ 50); 2,2'-azobis(2,4-dimethylvaleronitrile) (VAZO™ 52); 2,2'-azobis(isobutyronitrile) (VAZO™ 64); 2,2'-azobis-2-methylbutyronitrile (VAZO™ 67);1,1'-azobis (1-cyclohexanecarbonitrile) (VAZO™ 88), all of which are available from DuPont Chemicals and 2,2'-azobis(methyl isobutyrate) (V-601) available from Wako Chemicals.

Suitable peroxide initiators include, but are not limited to, benzoyl peroxide, acetyl peroxide, lauroyl peroxide, decanoyl peroxide, dicetyl peroxydicarbonate, di(4-t-butylcyclohexyl) peroxydicarbonate (PERKADOX™ 16, available from AKZO Chemicals), di(2-ethylhexyl) peroxydicarbonate, t-butylperoxypivalate (Lupersol™11, available from Atochem), t-butyl peroxy-2-ethylhexanoate (Trigonox™ 21-C50, available from Akzo Chemicals, Inc.), and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfite; systems based on organic peroxides and tertiary amines (for example, benzoyl peroxide plus dimethylaniline); and systems based on organic hydroperoxides and transition metals, for example, cumene hydroperoxide plus cobalt naphthenate.

Other initiators include, but are not limited to pinacols, such as tetraphenyl 1,1,2,2-ethanediol.

Preferred thermal free-radical initiators are selected from the group consisting of azo compounds and peroxides. Most preferred are V-601, Lupersol™ 11 and Perkadox™ 16, and mixtures thereof.

The initiator is present in a catalytically-effective amount and such amounts are typically in the range of about 0.01 parts to 5 parts, and more preferably in the range from about 0.025 to 2 parts by weight, based upon 100 total parts by weight of monomer or monomer mixture. If a mixture of initiators is used, the total amount of the mixture of initiators would be as if a single initiator was used.

Additives

The polymerizable mixture may also contain one or more crosslinking agents to enhance the cohesive strength of the resulting adhesive or article without unduly affecting its compliance. This can be accomplished by using a crosslinking agent in conjunction with a thermal initiator. Crosslinking agents useful in the invention include, but are not limited to, multifunctional acrylates, such as those selected from the group consisting of $C_1$ to $C_4$ alkyl di- and tri-acrylates, including, for example, 1,4-butanediol diacrylate, 1,6-hexanediol diacrylate, 1,8-octanediol diacrylate, neopentyl glycol diacrylate, glycerol diacrylate, and trimethylolpropane triacrylate; bisamides such as methylenebisacrylamine, N,N'-bis-1,2-propyleneterephthalamide; divinylbenzene; benzaldehyde, acetaldehyde, anthraquinone, substituted anthraquinones, various benzophenone-type compounds and certain chromophore-substituted vinyl-halomethyl-s-triazines, such as 2,4-bis(trichloromethyl)-6-p-methoxystyryl-s-triazine. Preferred crosslinking agents in the invention are multifunctional acrylates, most preferably 1,6-hexanediol diacrylate.

When a foam-like material or foam PSA tape is desirable, a monomer blended with polymeric or inorganic microspheres may be used. The microspheres may either be solid or hollow and/or tacky or non-tacky. The microspheres should have an average diameter of 10 to 200 micrometers, and comprise from about 5 to about 65 volume percent of the PSA layer. Preferred glass microspheres have average diameters of about 50 micrometers. Especially preferred microspheres are polymeric microspheres, such as those described in U.S. Pat. Nos. 3,615,972, 4,075,238 and 4,287,308. In addition, the foamed materials can be made using frothing processes with conventional gases, such as nitrogen. Chemical blowing agents may also be used to produce the foamed structures.

Often it is desirable to have adhesives that have a high degree of ionic content, such as for conducting adhesives. In this case, it is desirable that a large portion, typically greater than 50%, of the monomer mixture comprise monomers selected from classes C, F, and G described previously.

Additives can also be added including stabilizers against thermal and UV degradation, such as benzophenones, cyanoacrylate esters, copolymerizable UV absorbers and the like. Further additives can include fillers, such as fumed silica, hydrophobic silica (U.S. Pat. Nos. 4,710,536 and 4,749,590), alumina, carbon black, and natural and synthetic resins in particulate, flake or fibrous form. For various applications, foaming agents, such as low-boiling hydrocarbons, fluorinated materials; colorants, dyes and pigments; flame-retardants; anti-static agents; and coupling agents for additives, such as silanes, may be added. Advantageously, actinic radiation opaque additives can be added to the polymerizable mixture. When additives are present, they are added in amounts consistent with the publicly known functional uses of such additives.

Tapes, Labelstock or Free-standing Films

The present process may be used to manufacture many different types of tapes. Various flexible backings and liners (also referred to as "substrates") may be used, including films (transparent and non-transparent), cloths, papers, non-woven fibrous constructions, metal foils, aligned filaments and the like. The backings and liners are chosen to be compatible with the processing parameters of the present invention. For example, an untreated paper liner may not be the backing or liner of choice when using a fluid heat exchange medium, such as water.

The polymerizable mixture or prepolymerized syrup can be coated onto any suitable substrate. Furthermore, the polymerizable mixture can be coated onto a moving substrate that does not become a part of the finished article, so as to produce a free standing film or sheeting.

Air can be excluded by sandwiching the liquid polymerizable mixture between layers of sheet material. As will be appreciated by those skilled in the art, such materials can have low adhesion surfaces and can be removed after polymerization is complete or one such surface can be a tape backing material.

Thermal Processing

General

Figure 1:
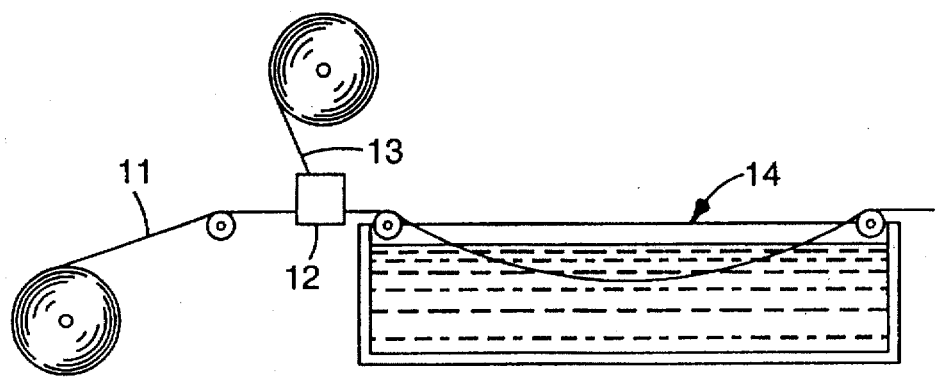
FIG. 1 is a block diagram schematically illustrating the inventive 1-zone process.
Figure 2:
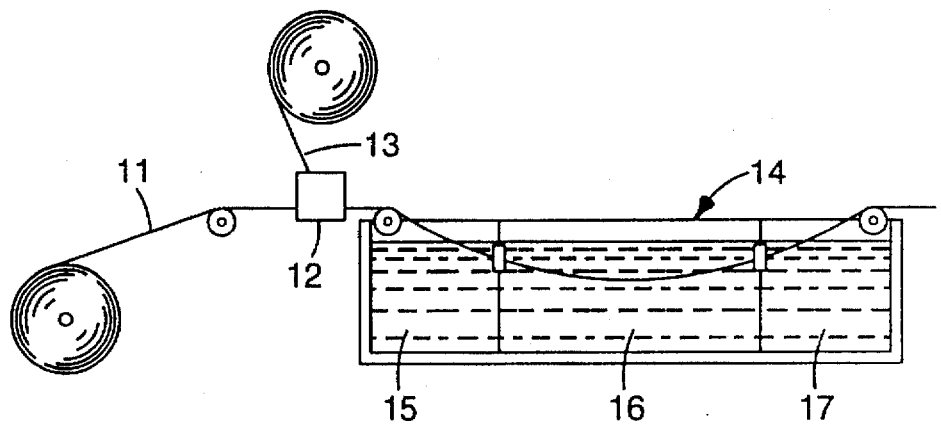
FIG. 2 is a block diagram schematically illustrating the inventive multi-zone process.

Referring to FIGS. 1 and 2 a single heating zone in the polymerization zone process and a multiple heating zone in the polymerization zone process are schematically illustrated. The coating composition, which is a monomeric mixture or partially prepolymerized syrup, and which has a viscosity compatible with known coating techniques, is coated, via a coating station 12 onto at least one major surface of a carrier web 11. In many situations, it may be desirable to coat between a bottom carrier web 11 and an upper carrier web 13.

Once coated, the coating composition is processed through a polymerization zone 14 wherein the coating composition is thermally polymerized by heating the same within a thermal buffer, said thermal buffer having a heat transfer process characterized by a heat transfer coefficient of at least 25 W/(m$^2$.K) to a temperature sufficient to initiate the thermal polymerization for a period a time sufficient to effect about 5-100% conversion of the monomeric mixture or prepolymerized syrup to polymer. When the process is carried out in one heating zone (14), it is preferred that the time and temperature be such that at least 90% of the monomeric mixture or prepolymerized syrup is converted to a polymer. Furthermore, it is advantageous that the heat transfer coefficient for the heat transfer process within the thermal buffer be relatively high, preferably 100 W/(m$^2$.K) and most preferably at least 500 W/(m$^2$.K).

If more than one heating zone is used, as illustrated in FIG. 2, the first heating zone (16) of the polymerization zone (14) can effect as little as 5% conversion of the mixture. Preferably, the multi-stage process (that is, utilization of more than one heating zone or the combination of a pre-heating zone and at least one heating zone) is conducted continuously, or in-line without interruption of the polymerization process, that is, the coated mixture is heated to a first temperature and maintained for a first time period and then immediately moved into a second heating zone (17) with no interruption of the process between the heating zones. There may also be a preheating zone (15), wherein the coated mixture is heated to a point just before commencement of polymerization. When using more than one heating zone, the temperature of the second heating zone (17) is generally greater than that of the first heating zone (16), especially for completely thermally initiated polymerizations.

Although FIG. 2 illustrates a two heating zone scheme, it is within the scope of the present invention to use more than two heating zones. When each zone subsequent to the first heating zone (16) is used to initiate a thermal initiator, the temperature of each subsequent zone is higher than the previous zone. However, when a zone subsequent to the first heating zone (16) is used to initiate a photoinitiator, the temperature may or may not be higher. It should be noted that when zone two (17) is a photoinitiation zone, the % conversion of the polymerizable mixture within zone one (16) should be at least 50%.

When a single coated carrier web is used in the inventive process, polymerization is preferably carried out where oxygen is excluded from the polymerization zone (for example, by using deoxygenated water in that type of thermal buffer). However, when the monomeric mixture or partially prepolymerized mixture is coated between two carrier webs, as shown in FIGS. 1 and 2, it is generally not necessary to exclude oxygen from the thermal buffer.

It is also contemplated that multiple coating stations (12) can be serially or in parallel positioned prior to the polymerization zone (14). This can be accomplished with or without the use of multiple upper carrier webs (13).

The heat transfer process within the thermal buffer can include but is not limited to forced or impinged air, helium, or hydrogen; heat transfer via conduction, such as a metal platen, or heated metal rolls; or via convective transfer to liquids, such as water, perfluorinated liquids, glycerin, or propylene glycol. Heat transfer processes that are characterized by having heat transfer coefficients of at least 25 W/(m$^2$.K) are considered to be within the scope of the present invention. Additionally, it is also within the scope of the present invention to add salts or other low molecular weight organic compounds to a fluid heat transfer medium to alter the characteristics of the thermal buffer, such as providing for reduced oxygen content, solubility of monomers and the like. It should be noted that it is not necessary within the thermal buffer to surround the coated construction with the heat transfer medium; contact on one side of the carrier web or polymerization mixture may be sufficient. Furthermore, physical properties, such as boiling point of the heat transfer fluid should be taken into consideration when designing a thermal buffer, along with initiator type and concentration, processing temperature and the like.

Adhesive tapes of the present invention, such as transfer, microstructured, foamed, and/or opaque tapes can be prepared as stacked layers and/or in multiple layers, wherein more than one layer of polymerizable compositions is coated between more than one solid sheet material, then passed into at least one heating zone to effect polymerization of all layers. This is an advantage over photopolymerizable systems, wherein the polymerizing radiation may have difficulty reaching into all layers of the construction equally. An additional advantage is that two or more different liner materials may be used simultaneously in order to improve the efficiency and throughput of tape production facilities. As will be appreciated by those skilled in the art, such liner material can have low adhesion surfaces and can be removed after polymerization is complete or one such surface can be a tape backing material that remains permanently affixed to the finished adhesive product. can be removed after polymerization is complete or one such surface can be a tape backing material that remains permanently affixed to the finished adhesive product.

Figure 3:
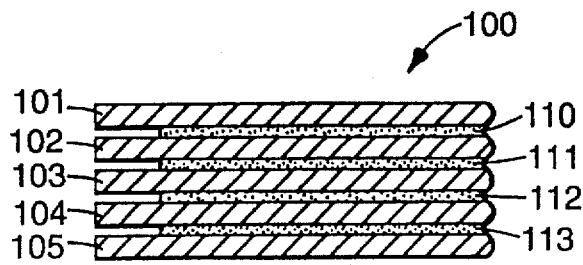
FIG. 3 is a cross-sectional view of a stack configuration.

Referring to FIG. 3, a stacked tape configuration is illustrated comprising a four stack layered tape 100 having five liners (101,102, 103, 104, 105) separating four coated layers of thermally polymerized material (110, 111, 112, 113). Although FIG. 3 shows five liners, it is within the scope of the present invention to have the top most layer 110 be open faced, that is, there would be no liner 101. Furthermore, it should be appreciated that the configuration illustrated is merely a single contemplated configuration. For example, the number of layers should not be construed to be limited to four and could be two or more, the liners used could be different materials, the thermally polymerized materials could be different for each layer, or even multilayered (see FIG. 4, infra) between each liner.

Figure 4:
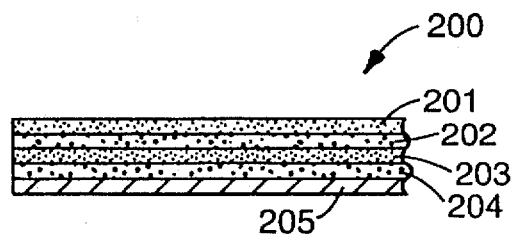
FIG. 4 is a cross-sectional view of a multi-layered configuration.
Figure 5A:
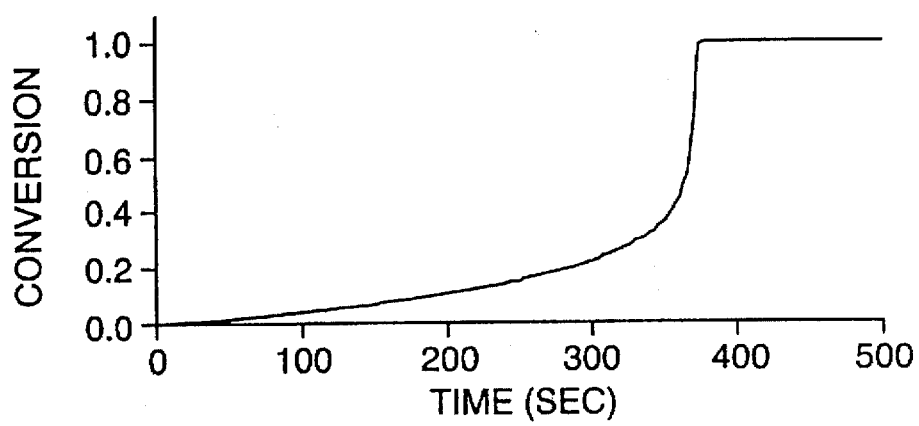
FIGS. 5(a) to (e) are graphical representations for an isooctyl acrylate/AIBN polymerizable composition thermally polymerized in forced air based on the calculations and equations set forth in the specification.
Figure 5B:
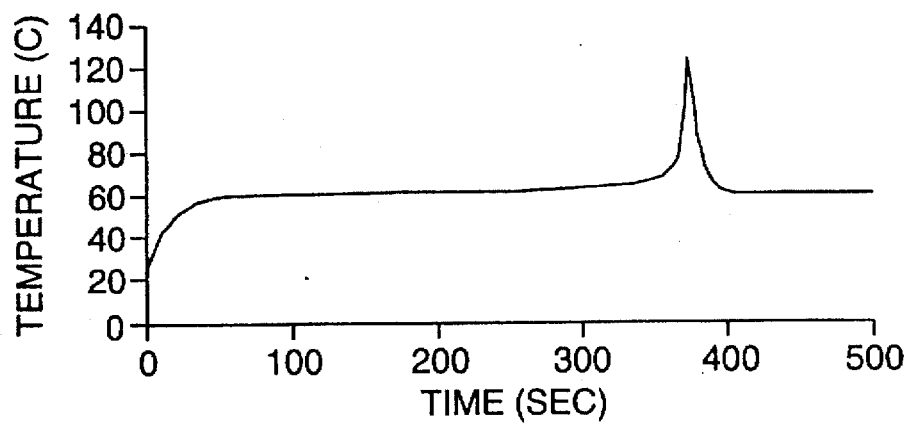
Figure 5C:
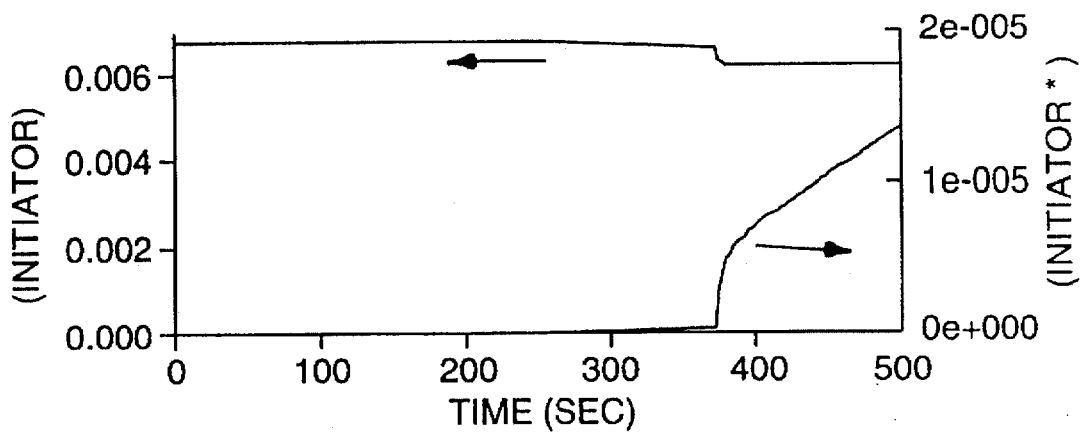
Figure 5D:
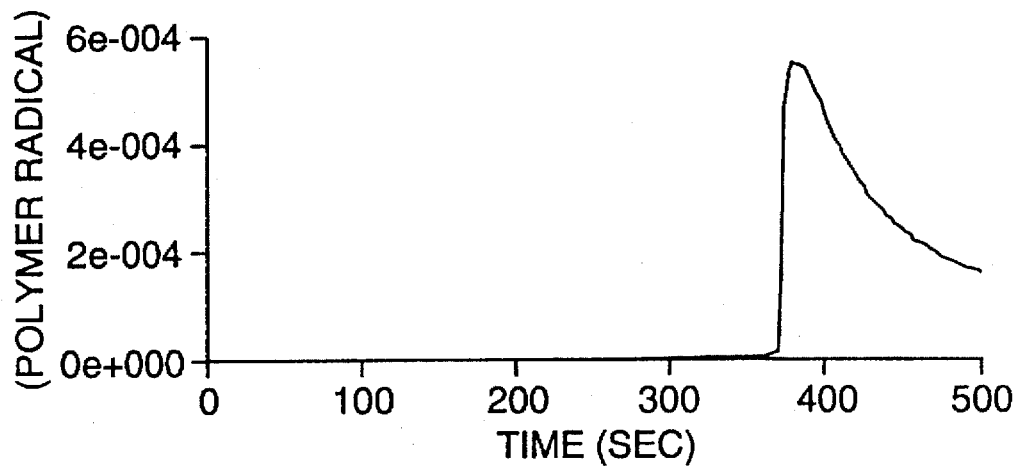
Figure 5E:
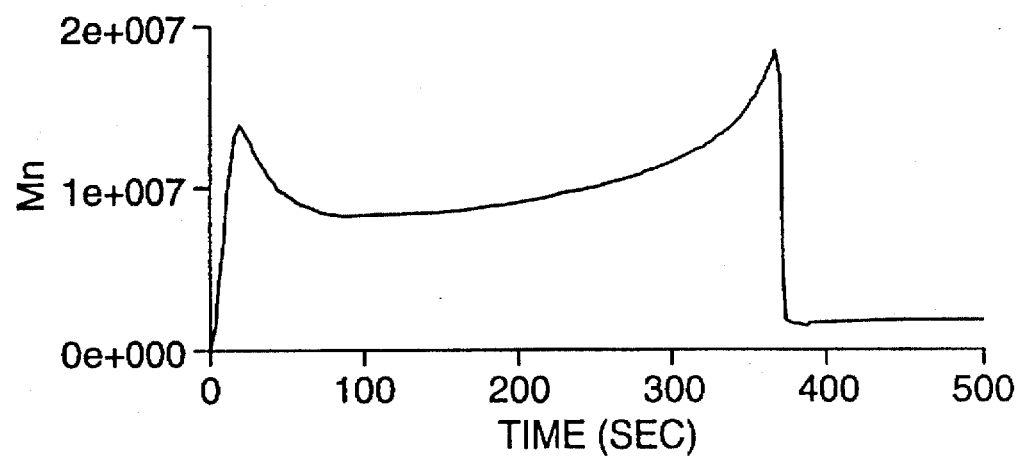
Figure 6A:
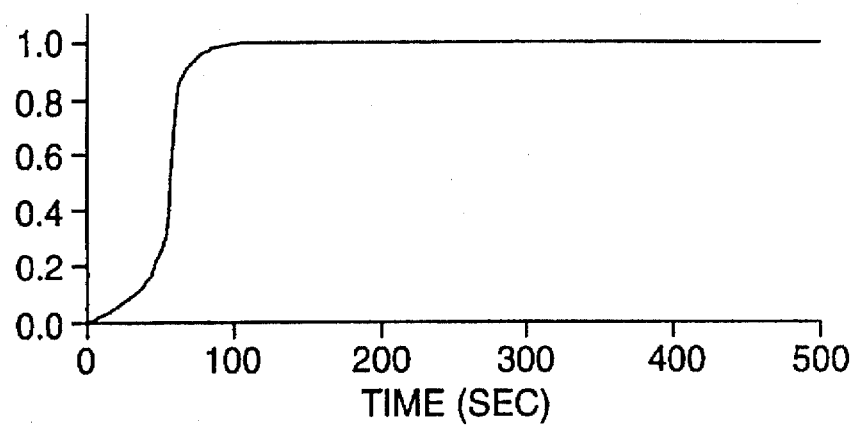
Figure 6B:
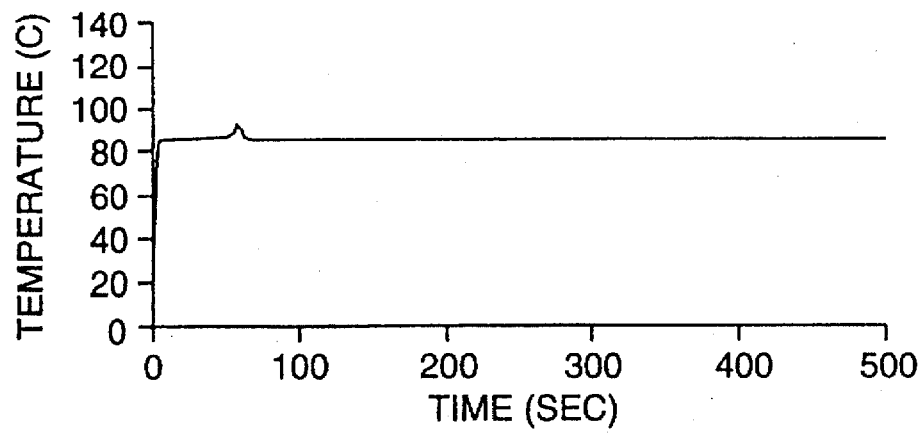
Figure 6C:
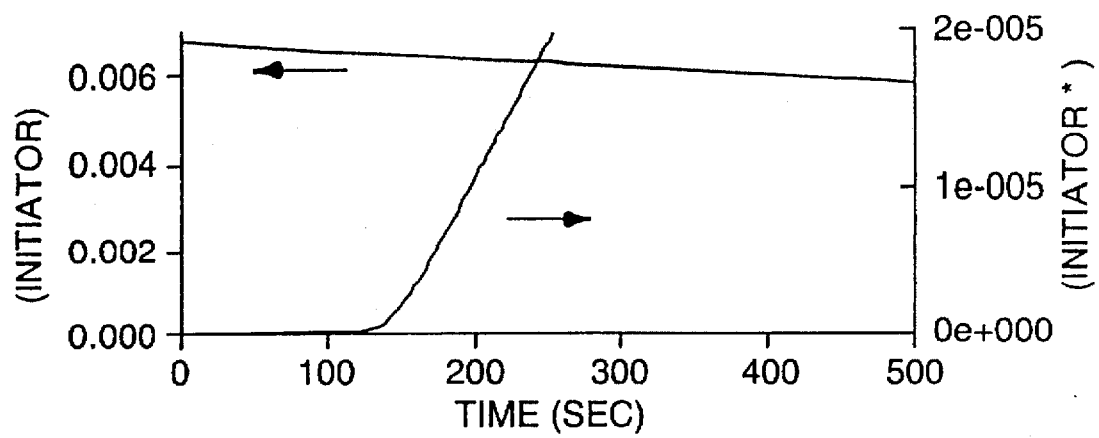
Figure 6D:
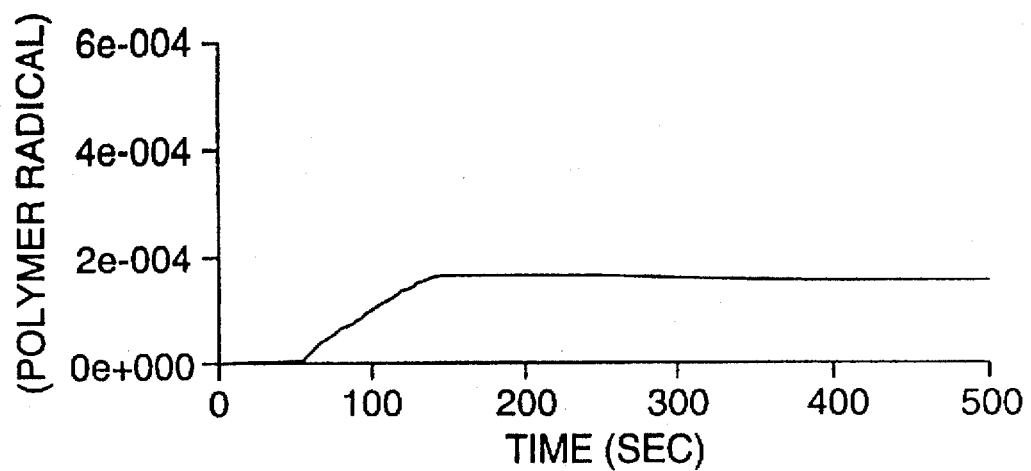
Figure 6E:
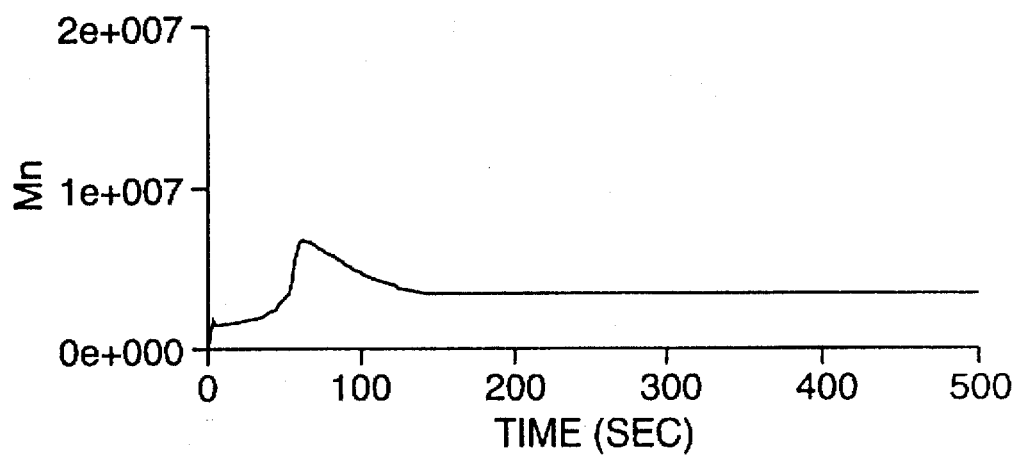

Referring to FIG. 4, a multi-layered tape configuration (200) is illustrated comprising four layers (201,202, 203, 204) coated on a liner (205). It should be appreciated that FIG. 4 is merely a single contemplated configuration and that the process of the present invention is applicable to multilayered tapes having more than one layer of thermally polymerizable or polymerized material coated on at least one liner, typically between two liners, and further may be part of the stacked configuration shown in FIG. 3.

The cured coated constructions can be post-treated or post-conditioned, that is, further treated after polymerization of the polymerizable compositions. Such treatments can be useful, for example to minimize monomer residuals, increase shear strength, corona-treat the coating, and provide cross-linking. Post treatment techniques typically involve an energy source such as UV, microwave, e-beam, IR, VIS, electromagnetic radiation, radiant heat, forced air, impinged air, metal platens, and heated metal rolls. It will be appreciated that any post-treatment or conditioning process typically used by those skilled in the art for treating tapes, films and the like can be used in combination with the present invention. quantify the general phenomenon of thermal runaway for free radical polymerization. Free radical polymerization can be described by the following reaction scheme:

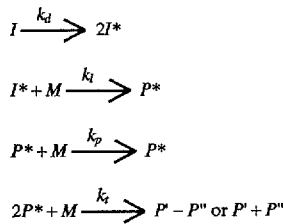

wherein P. is the growing polymer radical, $P^* \equiv [P.]$ and is the concentration of growing chains, I is the initiator and [I] is the initiator concentration, $I^* \equiv [I.]$ and is the concentration of initiator radical, $k_d$ is the rate coefficient for the dissociation of the initiator, $k_p$ is the rate coefficient for the propagation of the polymerization, $k_t$ is the effective rate coefficient for the termination reaction, M is the monomer species, and [M] is the concentration of the monomer. Based on this reaction scheme, experimental results on the kinetics of polymerization for specific acrylate monomers, polymerization kinetics (Odian, *Principles of Polymerization*, 3rd ed. John Wiley & Sons, Inc., 1991, pp 198–274), basic heat transfer principles (Kreith, *Principles of Heat Transfer*, 4th ed. Harper & Row, 1986, chpts 1, and 6–9) and an understanding of the viscosity dependence of the rate coefficients in the above reaction scheme (Macromolecules 1983, vol 16, pp 348ff), an upper limit on the rate of initiation ($R_I$) can be established using the criterion:

$$P^* X_n \leq \frac{k_p[M]}{k_t} \quad (1)$$

wherein P., $k_p$, $k_t$, and M are as described above and $X_n$ is the average chain length or kinetic chain length. This criterion was confirmed by simulations (see Examples 29 and 30 infra) in comparing the regions within the maximum temperature thermal when using forced air convection and forced water convection as the heat transfer process in the thermal buffer. Using quasi-steady state approximation for $P^* = (k_d[I]/k_t)^{1/2}$, the quantity C can be defined as:

$$C \equiv \frac{R_p}{X_n k_d[I]} \quad (2)$$

where $R_p$, is the rate of polymerization (=–dM/dt). Then, the criterion for the upper limit of the rate of initiation can be rewritten as C>1. Physically, since $1/k_d[I]$ is essentially the average time between chain initiations, and $X_n/R_p$ is the average time it takes to make a chain of length $X_n$, this inequality simply states that there must be enough time to grow a long chain before termination occurs by a newly created polymer radical.

As an illustration, in the critical region where convective air heat transfer is used in the thermal buffer, (see for example, Example 29 for the monomer and initiator, infra), $M_n \approx 5 \times 10^6$ grams, which with a monomer molecular weight of 184 grams gives $X_n \approx 3 \times 10^4$. The rate of polymerization was on order of 0.23 molar/sec, so that $R_p/X_n \approx 1 \times 10^{-5}$ molar/sec. The rate of initiation was near $9 \times 10^{-5}$ molar/sec ([I]=$6 \times 10^{-3}$ molar and $k_d$ near the temperature peak was 0.01/sec), so that in the run-away region, C=0.1. Hence, the above criterion is in fact not met, resulting in undesirably short chains. When convective heat transfer using water is used as the thermal buffer, as in Example 30, even in the peak temperature region, C=3.1. This resulted in high molecular weight polymer chains. Therefore, chains in the latter case are more likely to grow longer than in the former case. This helps illustrate the important role the rate of heat transfer plays in determining the value of C.

Criteria for controlled thermal polymerization of acrylates resulting in linear polymers are threefold:

The rate of initiation, $k_d[I]$, must be less than the rate of polymerization per repeat unit, $R_p/X_n$ to create large molecular weights. This was the criterion for C previously discussed. The maximum value for the dissociation rate coefficient ($k_{dmax}$) is then approximately $R_p/[I]X_n$.

In the steady state, the criterion for C can be re-written as:

$$k_{dmax}[I] = \{k_p[M]/X_n k_t^{1/2}\}^2$$

Similarly, the maximum rate of polymerization can be written as:

$$R_{pmax} = \{k_p[M]/k_t^{1/2}\}^2/X_n$$

Note that $R_{pmax}$ depends only on the monomer system used and is independent of the initiator type.

The minimum value for dissociation rate coefficient ($k_{dmin}$) is derived from the desired minimum rate of polymerization, $R_{pmin}$. In the steady state, this can be written as $$k_{dmin} = \{k_t/[I]\}(R_{pmin}/k_p[M])^2.$$

The ratio of $R_{pmin}/R_{pmax} = (k_{dmin}/k_{dmax})^{1/2}$.

The rate of initiation in turn is determined by the initiator type and depends on temperature according to the usual Arrhenius relationship:

$$k_d = Ae^{-E_a/RT}.$$

The range of allowed temperatures for the polymerization, $T_{min}$ to $T_{max}$, is then determined by $$k_{dmax}/k_{dmin} = \exp(-E_a/R\{1/T_{max} - 1/T_{min}\}).$$

Therefore, once the ratio $R_{pmin}/R_{pmax}$ is chosen for a given initiator, $T_{min}$ and $T_{max}$ are determined. $R_{pmin}$ is typically chosen as a practical processing limitation, that is, the lower $R_{pmin}$, the longer the processing time.

Thermal control of the polymerization process of the current invention can be stated as follows. As the polymerization occurs throughout the cross-section of the polymerization mixture, the energy balance on a small unit volume of polymerizable mixture contains components relating to the internal heat generation created by the polymerization reaction and on the heat transfer by conduction into and out of the small unit volume from the surrounding units volumes. The rate of heat flow out of a unit volume must be fast enough to prevent an excessive temperature rise within the unit volume caused by the reaction exotherm. The maximum allowable temperature rise within the unit volume in order to prevent the reaction from failing the criterion for C previously discussed, is approximately 20° C. Thus, for any point within the polymerizing mixture, the criterion for C must be met (and the 20° C. temperature rise limit must not be exceeded), not just on an average over the whole mass, but at each point within the polymerizable mixture as well.

At the boundary between the thermal buffer and the coated carrier web, the energy balance depends on conduction into a unit volume from surrounding unit volumes, convection (or conduction) to and from the thermal buffer, and heat generated by the polymerization exotherm. An important parameter in the transfer of heat to and from solid structures, including coated webs, is the Biot Number.

$$BN=hD/k,$$

where BN is the Biot Number, h is the heat transfer coefficient between the thermal buffer and the coated web, D is the thickness of the coated web (½ of the coating thickness when the web is fully surrounded in the thermal buffer, that is, twice as much area for heat transfer as in contact from one side), and k is the thermal conductivity of the coated web. Thus, the Biot Number represents a ratio between the resistance to heat flow between the coated web and the thermal buffer to the resistance of heat flow within the buffer. When the Biot Number is low (BN<0.1), the object (coated web) can be assumed to be isothermal. In this case, the temperature at any point within the polymerizing mixture will be nearly uniform, and the temperature of the entire web will be determined by the efficiency with which heat is transferred to the thermal buffer.

For very thick webs (large D) or high rates of heat transfer to and from the thermal buffer (large h) or low thermal conductivity of the coated web (such as with frothed foams), a temperature gradient will exist through the thickness of the coated web. In this situation, it is necessary, in order to properly design the thermal buffer, that the energy balance through the thickness of the web be solved in order to keep the value of C, previously defined, less than or equal to unity. This can be done in accordance with the teachings in Kreith on transient heat flow in planar objects. It such cases it is also important to know the heat capacity of the polymerizing mixture, in order to calculate the temperature rise to be expected due to the energy balance solution. In most practical cases, the temperature gradient is fairly small, so that the most important value for determining the stability of the reaction is the rate of heat transfer between the coated web and the thermal buffer. For example, using a typical value for the thermal conductivity of an acrylic polymer (0.21 W/(m.°C.), a coating (20 mils), and the minimum value of h between the thermal buffer and the coated web (25 W/($m^2$.K)), the value of the Biot Number is about 0.06. In any case, since the temperature rise allowable for any unit volume within the polymerizable composition is on the order of 20° C., the rate of heat transfer within the coating composition is fairly high since it depends on the temperature differential between the hottest part of the mixture and the surface temperature of the coated web at the thermal buffer interface, and so significantly higher Biot numbers are not a major concern, provided that the criterion for C is met throughout the coated web.

Assuming that internal heat conduction is not a rate-limiting step, the temperature of the polymerizing mixture is maintained between $T_{min}$ and $T_{max}$ by sufficient heat transfer between the polymerizing mixture and the thermal buffer. The equation can now be written as:

$$h_{min}=DR_{pmax}H_p/(T_{max}-T_{buf}),$$

wherein $H_p$ is the heat of polymerization, D is the coating thickness, and $T_{buf}$ is the nominal temperature of the thermal buffer. Thus the above temperature requirement allows one to directly calculate the value for $h_{min}$ when designing a thermal buffer for a particular process and product. Note that the above relationships constrain the temperatures allowable within the thermal buffer $$T_{max}>T_{buf}>T_{min}$$

Results of calculations based on these relationships are illustrated in FIGS. 7–11. FIG. 7 shows $T_{max}$ as a function of the 10 hour half-life temperature ($T_{1/2}$) for various thermal initiators at different initiator weight percents in isooctyl acrylate ($k_p/k_t^{1/2}=9.9$ $molar^{-½}sec^{-½}$ (experimentally determined)), for a desired molecular weight of $5.5\times10^6$ Daltons. Thus, for a given initiator, for example AIBN, at a given loading, such as 0.05%, the calculated $T_{max}$ can be found by referring to FIG. 7 (about 100° C.). For a slower polymerizing system such as methyl acrylate (MA) for the same $X_n$, $T_{max}$=50° C. This result is consistent, since $T_{max}$ should be lower for slower reacting monomers such as methyl acrylate in order to allow the initiation rate to be low enough to allow the polymerization rate to be high enough (vs. the initiation rate) to allow the creation of high molecular weight chains).

FIGS. 9–11 show the minimum heat transfer coefficient ($h_{min}$) to accommodate $T_{max}$ and the desired $R_{pmin}$ assuming that the temperature of the thermal buffer is equal to $T_{min}$. Determining the value for $h_{min}$ when the thermal buffer temperature is not equal to $T_{min}$ is done by multiplying the value determined above by the ratio of temperature differences in the usual fashion. $R_{pmin}$ is conveniently expressed as a fraction, a, of the maximum rate of polymerization, $R_{pmax}$. From the Figures, for a 0.5 mm thick coating, a $T_{max}$ of 100° C. at a=0.2 would require $h_{min}$=280 W/($m^2$.K) when $T_{buf}$ is equal to $T_{min}$. Under the same conditions, for a=0.6, $h_{min}$=850 W/($m^2$.K). The Figures show h values for convection using high speed air and for convection using flowing water, and these show that high speed air would be only a marginal heat transfer process even at 3050 m/min. The situation is even more severe for a higher activation energy initiator such as dicumyl peroxide. However, at a much thinner coating thickness of 0.05 mm, using forced air convection in the thermal buffer is adequate for good control.

Alternatively, criteria for controlled thermal polymerization of acrylates resulting in linear, cross-linked or branched polymers can exclude reference to $X_n$, since for branched and crosslinked systems the number-average degree of polymerization has no meaning (although one can speak of a "kinetic chain length"). In this instance, the reaction can be described as being maintained in a condition such that $R_i<R_t$, wherein $R_i$ is the rate of initiation and $R_t$ is the rate of chain termination. Physically, this means that on average every initiated chain fully terminates, including branches, prior to the next initiation, or equivalently, the number of growing chains per unit time does not significantly increase. Otherwise, newly initiated chains terminate live chains and branches, producing unacceptably low molecular weight. In the limit that an initiator radical quickly reacts with monomer to initiate a chain, this criterion translates into:

$$k_{dmax}[I] = \left(\frac{R_{pmax}\sqrt{k_t}}{k_p[M]}\right)^2 \tag{3}$$

The minimum value for dissociation rate coefficient ($k_{dmin}$) is derived from the desired minimum rate of polymerization, $R_{pmin}$. In the steady state, this gives $$k_{dmin}=k_t(R_{pmin}/k_p[M])^2/[I].$$

The rate of initiation in turn is determined by the initiator type and the temperature according to the Arrhenius relationship, $k_d=Ae^{-E_a/RT}$. The range of allowed temperatures for the polymerization, $T_{min}$ to $T_{max}$ is then determined by $$k_{dmax}/k_{dmin}=\exp(-E_a/R\{1/T_{max}-1/T_{min}\}).$$

Therefore, once the ratio $R_{pmin}/R_{pmax}$ is chosen for a given initiator, $T_{min}$ and $T_{max}$ are determined. As stated above $R_{pmin}$ is selected to comply with predetermined processing times.

Therefore, for branched and cross-linked systems, as in the linear systems described above, the temperature of the polymerizing mixture is maintained between $T_{min}$ and $T_{max}$ by sufficient heat transfer between the coated web and the thermal buffer as determined by $$h_{min} = DR_{pmax}H_p/(T_{max}-T_{buf}),$$

assuming that the important heat transfer step is between the coated web and the thermal buffer and not internal conduction in the coated web.

$R_{pmax}$ can be determined experimentally using UV or thermal cure of thin samples where thermal runaway can be neglected, that is, $R_{pmax}$ is the maximum slope of the plot of a monomer/polymer conversion versus time.

Temperature Control

The criterion for C stated previously relates to the effect of controlling temperature and its effect on the rate of heat generation via the Arrhenius relationship, $k_d = Ae^{-E_a/RT}$. If $k_d$ gets too large due to thermal runaway, C will exponentially decrease and result in a proliferation of short chain lengths. The tolerable change in temperature $\Delta T$ throughout the polymerizing mixture should be less than $T^2(R/E_a)(\Delta C/C)$. As the above example suggests, a significant change in C will be on the order of 1. For example, using AIBN as the initiator, which has an $E_a=31.1$ kcal/mole, this works out to be $\Delta T < 8°$ C. Lack of temperature control near this limit will lead to high polydispersity. Thermal runaway will further drive the reaction to generate short chains.

Of course a rapid temperature rise has other undesirable effects, including potentially the excessive evaporation of monomer, warping of the product, and bubble formation.

Heat Transfer

The rate of heat removal is a complex function of conductive transfer, convective transfer (turbulent or laminar), thermal mass, rate of reaction, and thermal conductivity. Nevertheless, some simple estimates can be made. Since beyond a certain thickness, no amount of external heat transfer will prevent thermal run-away, one issue for temperature control is the rate of heat transfer to and from a thermal buffer. The above calculations assume that internal heat conduction within the coated polymerizable mixture is not the rate limiting step for heat transfer. Thermal control can then be maintained provided the rate of heat production (dQ/dt) is balanced by conductive and/or convective transfer using the following equation:

$$\frac{dQ}{dt} \leq \frac{h(T-T_f)}{D} \quad (4)$$

wherein $dQ/dt = H_p R_p$, $H_p$ is the heat of polymerization, $R_p$ is the rate of polymerization, h is the heat transfer coefficient, T and $T_f$ are the web and thermal buffer temperatures, respectively, and D is the thickness of the polymerizable coating mixture.

Using $H_p=14$ kcal/mole ($5.9 \times 10^4$ joules/mole, values typical for (meth)acrylates), $R_p=0.3$ molar/sec, $D=10$ mils ($2.5 \times 10^{-4}$ m), and the above criterion for temperature control, $T-T_f=8°$ C., the minimum h value is approximately 600 W/m$^2$.K. For air flowing at 600 m/min, h=50 W/m$^2$.K, which is an order of magnitude too small for a well-controlled reaction, even for thin samples. For static water, h=465(T-T$_f$)$^{1/3}$ W/(m$^2$.K) or about 1000 W/m$^2$.K, which is adequate to remove the heat and keep the temperature rise below the limit for producing a high molecular weight polymer with an acceptable polydispersity, as defined by the criterion for C.

When the following are values provided, the parameters for a well-controlled temperature thermal polymerization can be selected. Ranges and concentrations that can be determined experimentally or chosen a priori are as follows:

(1) Range of monomer concentration ([M]) and the heat of polymerization (H$_p$). Measurements can be made of conversion slopes to obtain $k_p/k_t^{1/2}$. $H_p$ can also be measured by DSC.

(2) Initiator concentrations, molecular weight, activation energy ($E_a$), and the prefactor (A). A and $E_a$ can be derived from half-lives at two temperatures for the selected initiator.

(3) The minimum rate of polymerization and the maximum rate of polymerization, or a range of acceptable absolute rates.

(4) The heat transfer coefficient (h) in W/(m$^2$.K).

(5) The number average degree of polymerization or kinetic chain length of the desired product ($X_n$).

(6) Coating thickness(es) (D) on the carrier web or liner or backing.

(7) Heat capacity of the polymerizing mixture.

Objects and advantages of this invention are further illustrated by the following examples, but the particular materials and amounts thereof recited in these examples, as well as other conditions and details, should not be construed to unduly limit this invention. All materials are commercially available, for example from Aldrich Chemical Company or known to those skilled in the art unless otherwise stated or apparent.

| Glossary | |
|---|---|
| Aerosil™ 972 | fumed silica, available from Degussa |
| AIBN | azobis(isobutyronitrile) |
| FC-431™ | a fluorochemical surfactant, commercially available from 3M |
| FC-171™ | |
| KB-1 | 2,2-dimethoxy-2-phenyl acetophenone, commercially available from Sartomer Chemicals |
| Lupersol™ 11 | t-butylperoxypivalate, commercially available from Atochem |
| Perkadox™ 16S | di(4-t-butylcyclohexyl)peroxydicarbonate, commercially available from Akzo Chemical |
| phr | parts per hundred of the syrup |
| Trigonox™ 21-C50 | t-butylperoxy 2-ethylhexanoate, commercially available from Akzo Chemicals, Inc. |
| V-601 | dimethyl 2,2'-azobisisobutyrate available from Wako Chemicals |
| VAZO™ 52 | 2,2'-azobis(2,4-dimethylpentanenitrile), available from DuPont |

EXAMPLES

TEST PROCEDURES

Static Shear Value at 70° C. and at 23° C.

A flat, rigid stainless steel coupon measuring 12.7 mm×50.8 mm×0.05 mm is cleaned and bonded to a strip of anodized aluminum measuring 12.7 mm×50.8 mm×0.05 mm by a 12.7 mm×25.4 mm piece of the adhesive layer to be tested such that all of the adhesive layer is in contact with both metal surfaces, and the bonded surfaces overlap. Before testing, a 2.35 kg roller is applied once in each direction over the bonded area. Then, the bonded sample is placed in an air-circulating oven which has been preheated to 70° C. and a 500 g weight is hung from the free end of the aluminum strip while the free end of the stainless steel coupon is attached vertically to a timing device. The time at which the weight falls is the "Static Shear Value at 70° C." If no failure is observed, the test is discontinued after 10,000 minutes. Only cohesive failure is reported.

When tested at 23° C., the sample is similarly disposed, except that a 1000 g weight is hung from the aluminum strip.

The time at which the weight falls is the "Static Shear Value at Room Temperature." If no failure, the test is discontinued at 10,000 minutes (note: this is designated in the tables as "10,000+"). Only cohesive failure is reported.

T-Peel

T-peel is measured in a manner similar to ASTM D-1876-93. An adhesive sample is placed between two strips of 12.7 mm×200 mm×0.125 mm anodized aluminum, leaving an adhesive-free 25 mm tab at each end of each aluminum strip. The assembly is rolled down with a 6.8 kg roller with one pass forward and one pass backward. The assembly is conditioned at room temperature for 1–2 hours. The tabs are bent back at 90° in opposite directions and respectively clamped in the upper and lower jaws of an Instron tensile testing machine. The jaws are separated at 30 mm/minute. The force required to pull apart the tabs is measured in Newtons/decimeter (N/dm). Only cohesive failures are reported.

90° Peel

The adhesive layer to be tested is transferred onto a 0.05 mm thick soft aluminum foil which is slit to a width of 12.7 min. The resulting tape is self-adhered to a stainless steel plate under the weight of a 2.35 kg hard-rubber-covered steel roller, one pass in each direction. After dwelling at 23° C. for 72 hours, the "90° Peel" is measured by moving the free end of the tape away from the stainless steel plate at a 90° angle at a rate of about 0.5 cm per second using an Instron tensile tester. Results are reported in Newtons/decimeter (N/dm).

Thermal Polymerization Procedure

Pressure sensitive adhesives and tapes of the invention were prepared by the general method described below. Optional, alternative processes and components are as noted. Results of pressure sensitive adhesive testing of each Example are shown in the tables. All component amounts are given in parts by weight, unless otherwise noted.

General Procedure—Polymerization

A mixture of free radically polymerizable monomers, in a predetermined ratio and a catalytically effective amount of photoinitiator was partially polymerized by exposure to UV irradiation under a nitrogen atmosphere to an approximate viscosity of about 1500 cps to prepare a coatable syrup. The syrup was then treated with 0.15 phr (parts per hundred of the syrup) of a thermal polymerization initiator and a cross-linking agent. Other monomers, additives, fillers, and/or initiators, can be added at this point. The mixture was then knife coated at a desired thickness onto at least one carrier web, which may be treated with a release agent, a primer, a barrier and the like as desired. In most cases, the syrup was coated between two carrier webs. The coated webs were drawn through a heated heat-transfer bath, typically hot water in a continuous process in which each part of the web remained in the bath for a period of time (one-zone heating). In the case of two-zone heating, the web was drawn from the bath and through heated platens spaced 1 cm apart. When the thermal buffer comprised platens, the platens were heated in the range of 103° C. to 140° C., and the carrier web remained in contact with the platens for a predetermined period of time. Except as noted, the carrier webs were then removed to obtain a free-standing pressure sensitive adhesive. Peel adhesion, shear strength and conversion obtained are summarized in the tables.

For the following illustrative example, the initiators used are summarized in Table 1

TABLE 1

| Designation | Initiator |
|---|---|
| A | VAZO ™ 52: 2,2'-azobis(2,4-dimethylvaleronitrile), (available from DuPont) |
| B | V-601: dimethyl 2,2'-azobis(2-methylpropionate), (available from Wako Chemicals) |
| C | Perkadox ™ 16S: di-(4-tertbutylcyclohexyl) peroxydicarbonate, (available from Akzo Chemicals, Inc.) |
| D | AIBN: 2,2'-azobis(isobutyronitrile) |
| E | Lupersol ™ 11: t-butylperoxypivalate (Available from Atochem) |
| F | Trigonox ™ 21-C50: t-butylperoxy 2-ethylhexanoate (available from Akzo Chemicals, Inc.) |

Syrup X

A mixture of 90 parts of isooctyl acrylate (IOA), 10 parts of acrylic acid (AA) and 0.04 parts of KB-1 photoinitiator was partially polymerized to a viscosity of about 1500 cps in a nitrogen atmosphere under ultraviolet radiation. The partially polymerized mixture is called a syrup. Just prior to coating, the syrup was de-gassed under vacuum to remove dissolved oxygen.

EXAMPLES 1 AND 2

Transfer tape, 1 zone, 1 initiator

To 100 parts of syrup X was added 0.05 phr of hexanediol diacrylate (HDDA) and 0.2 phr of thermal initiator as shown in Table 1. The mixture was then knife coated at a thickness of 0.254 mm between two 0.091 mm thick polyester (PET) carrier webs. The carrier webs were treated with a silicone release agent to facilitate removal. The carrier webs were then immersed in a 90° C. water bath as the thermal buffer. The residence time in the water bath was 8 minutes. A free standing pressure sensitive adhesive film was formed. The adhesive films were monitored for percent conversion of monomer using weight loss tests, conducted by heating a pre-weighed sample for 4 hours in a vented oven at 120° C., then re-weighing. The examples were also tested for peel strength and static shear to stainless steel. The results are summarized in Table 2.

TABLE 2

| Example | Initiator | % Residuals | Peel (N/dm) | Shear @ 70° C. (min) | Shear @ 20° C. (min) |
|---|---|---|---|---|---|
| 1 | A | 5.0 | 174 | 10,000+ | 10,000+ |
| 2 | C | 2.4 | 195 | 10,000+ | 10,000+ |

These results showed that commonly available thermal free radical sources such as azo compounds and peroxides were useful for producing pressure sensitive adhesives (PSAs) with high percent conversions using a one thermal zone process. The adhesive also exhibited high value of peel and shear, comparable to commercial adhesives. This showed that this invention was suitable for making high performance pressure sensitive adhesives.

EXAMPLES 3 THROUGH 6

Two zones, 2 initiators

To 100 parts of syrup X was added 0.15 phr of initiator A, and 0.1 phr initiator B. The amount of the crosslinker, HDDA, was varied according to Table 3. The mixture was then knife coated at a thickness of 0.254 mm between two 0.091 mm thick PET carrier webs. The carrier webs were treated with a silicone release agent to facilitate removal. The carrier webs were then drawn through a 80° C. water bath as a first thermal buffer. The residence time in the water bath was 4 min. The carrier webs were then drawn between heated platens which served as the second thermal buffer. The gap between the platens was 1 cm. The heated platens were maintained at 103° C. The residence time of the carrier webs between the platens was 5 minutes. Free standing pressure sensitive adhesive films were formed. The adhesive films were tested for peel adhesion, static shear and % conversion and the results are summarized in Table 3.

TABLE 3

| Example | HDDA Level (phr) | % Residuals | Peel (N/dm) | Shear @ 20° C. (min) | Shear @ 70° C. (min) |
| --- | --- | --- | --- | --- | --- |
| 3 | 0.025 | 5.8 | 158 | 10,000+ | 10,000+ |
| 4 | 0.050 | 6.1 | 150 | 10,000+ | 10,000+ |
| 5 | 0.075 | 5.6 | 154 | 9161 | 10,000+ |
| 6 | 0.100 | 5.8 | 164 | 3291 | 10,000+ |

The results in Table 3 showed high performance pressure sensitive adhesives were formed that exhibited good peel and shear properties. The peel and shear values were found to be dependent on HDDA concentrations.

EXAMPLE 7 AND 8

Two zones, 2 initiators

To 100 parts of syrup X was added 0.05 phr of HDDA and thermal initiators as shown in Table 4. The mixture was then knife coated at a thickness of 0.254 mm between two 0.091 mm thick PET carrier webs. The carrier webs were treated with a silicone release agent to facilitate removal. The carrier webs were then drawn through a 90° C. water bath. The residence time in the water bath was 8 min. The carrier webs were then drawn between heated platens. The gap between the platens was 1 cm. The heated platens were maintained at 140° C. The residence time of the carrier webs between the platens was 10 minutes. Free standing pressure sensitive adhesive films were formed. The adhesive films were tested for peel adhesion, static shear and % conversion and are summarized in Table 4.

TABLE 4

| Example | Initiator (phr) | % Residuals | Peel (N/dm) | Shear @ 70° C. (min) | Shear @ 20° C. (min) |
| --- | --- | --- | --- | --- | --- |
| 7 | 0.2C + 0.15B | 1.73 | 177 | 10,000+ | 10,000+ |
| 8 | 0.2C + 0.3E | 1.75 | 199 | 10,000+ | 10,000+ |

These examples showed that the properties and residuals of the resulting adhesives were dependent on processing conditions. The results indicated that using an optimized two thermal zone, two initiator process achieved better properties than an optimized single thermal zone, single initiator process.

EXAMPLE 9

UV Opaque monomer

To 90 parts of syrup X was added 0.15 phr of initiator A, 0.1 phr of initiator B and 0.05 phr of HDDA. 10 parts of styrene monomer was then added to the syrup. The mixture was then knife coated at a thickness of 0.127 mm between two 0.091 mm thick polyester (PET) carrier webs. The carrier webs were treated with a silicone release agent to facilitate removal. The carrier webs were then drawn through a 85° C. water bath. The residence time in the water bath was 8 min. The carrier webs were then drawn between heated platens. The gap between the platens was 1 cm. The heated platens were maintained at 107° C. The residence time of the carrier webs between the platens was 10 minutes. The sample was then placed in a vented oven for 30 minutes at 110° C. A free standing pressure sensitive adhesive film was formed. The adhesive films were tested for peel adhesion, static shear and % conversion and the results are summarized in Table 5.

TABLE 5

| Example | % Residuals | Peel (N/dm) | Shear @ 70° C. (min) | Shear @ 20° C. (min) |
| --- | --- | --- | --- | --- |
| 9 | 4.0 | 151 | 7 | 307 |

Styrene is a UV opaque monomer. It is difficult to polymerize styrene monomer into a PSA using a process that makes use of a UV activated free radical source. The present invention showed that UV opaque monomers were polymerizable using an all thermal process.

EXAMPLE 10

PSA with low LEL (lower explosion limit) monomer

To 90 parts of syrup X was added 0.15 phr of initiator A, 0.1 phr of initiator B and 0.05 phr of HDDA. 10 parts of methyl acrylate monomer, (MA), was then added to the syrup. The mixture was then knife coated at a thickness of 0.127 mm between two 0.091 mm thick polyester (PET) carrier webs. The carrier webs were treated with a silicone release agent to facilitate removal. The carrier webs were then drawn through a 85° water bath. The residence time in the water bath was 4 min. The carrier webs were then drawn between heated platens. The gap between the platens was 1 cm. The heated platens were maintained at 107° C. The residence time of the carrier webs between the platens was 5 minutes. A free standing pressure sensitive adhesive film was formed. The adhesive films were tested for peel adhesion, static shear and % conversion and are summarized in Table 6.

TABLE 6

| Example | % Residuals | Peel (N/dm) | Shear @ 70° C. (min) | Shear @ 20° C. (min) |
| --- | --- | --- | --- | --- |
| 10 | 5.6 | 145 | 10,000+ | 10,000+ |

Methyl acrylate is a volatile, flammable monomer. Coaters designed to coat monomers such as MA have to be designed to be explosion proof (class 1, group D). A thermal process which uses a heat transfer fluid such as water has an advantage in reducing potential explosion hazards. A less expensive coater can be employed compared to conventional solvent based or UV coaters.

EXAMPLE 11

Opaque PSA

To 100 parts of syrup X was added 0.05 phr of HDDA, 0.15 phr of initiator A, 0.1 phr of initiator B and 3 parts of carbon black pigment mixture (Penn Color 9B117, available from Penn Color, Doylestown, Pa.). The mixture was thoroughly mixed using an air mixture and then degassed. The mixture was then knife coated at a thickness of 0.127 mm between two 0.091 mm thick PET carrier webs. The carrier webs were treated with a silicone release agent to facilitate removal. The carrier webs were then drawn through a 85° C. water bath. The residence time in the water bath was 8 min. The carrier webs were then drawn between heated platens. The gap between the platens was 1 cm. The heated platens were maintained at 110° C. The residence time of the carrier webs between the platens was 10 minutes. A free standing, opaque pressure sensitive adhesive film was formed. This example showed that thermal cure was useful for producing opaque articles.

EXAMPLES 12 AND 13

Opaque foam

A mixture of 87.5 parts of isooctyl acrylate (IOA), 12.5 parts of acrylic acid (AA) and 0.4 parts of KB1 photoinitiator was partially polymerized to a viscosity of about 1500 cps in a nitrogen atmosphere under ultraviolet radiation. To the partially polymerized mixture was added 0.15 phr initiator A, 0.1 phr initiator B, 0.5 parts HDDA, 3 parts of carbon black pigment mixture, 0.8 phr glass microbubbles (C15/250 glass microbubbles available from 3M Co.) and 10 phr fumed silica (Aerosil™ 972 available from Degussa). The mixture was then knife coated at a thickness of 0.916 mm between two 0.091 mm thick polyester (PET) carrier webs. The carrier webs were treated with a silicone release agent to facilitate removal. The carrier webs were then drawn through a 85° C. water bath. The residence time in the water bath was 8 min. The carrier webs were then drawn between heated platens. The gap between the platens was 1 cm. The heated platens were maintained at 110° C. The residence time of the carrier webs between the platens was 10 minutes. A free standing, opaque, foam-like pressure sensitive adhesive film was formed. The foam was tested for self stick peel, static shear, and percent conversion. The resulting foam-like sheet was also made into a double coated tape by laminating acrylic pressure sensitive adhesives to each side of the sheet and tested for T-peel and the results are summarized in Table 7.

TABLE 7

| Example | HDDA (phr) | % Residuals | Peel (N/dm) | Shear @ 20° C. (min) | Shear @ 70° C. (min) | T-Peel (N/dm) |
|---|---|---|---|---|---|---|
| 12 | 0.025 | 2.7 | 204 | 10,000+ | 10,000+ | — |
| 13 | 0.050 | 3.8 | 126 | 10,000+ | 10,000+ | 264 |

These results showed the thermal process of the present invention was useful for preparing pressure sensitive adhesive foams. The process can also be used to make opaque foams.

EXAMPLES 14 AND 15

Frothed PSA

To 100 parts of syrup X was added 0.05 phr of HDDA and 1 phr of surfactant mixture. The surfactant mixture consisted of a 50/50 by volume mixture of FC-171 and FC-431 (both available from 3M Co.). To this mixture was added free radical initiators as shown in Table 8. The sample was then frothed in a laboratory blender under a nitrogen atmosphere for one minute just prior to coating. The sample was coated at a thickness of 0.916 mm. The carrier webs were then drawn through a 90° water bath. The residence time in the water bath was 8 min. A frothed free standing pressure adhesive was obtained. The adhesives were tested for peel adhesion, static shear and % conversion and the results are summarized in Table 8.

TABLE 8

| Example | Initiator (phr) | % Residuals | Peel (N/dm) | Shear @ 70° C. (min) | Shear @ 20° C. (min) |
|---|---|---|---|---|---|
| 14 | 0.15D | 2.5 | 164 | 5294 | 10,000+ |
| 15 | 0.2C + 0.15B | 2.6 | 145 | 1332 | 10,000+ |

EXAMPLE 16

PSA tape

Example 16 was made by the same method as Example 7 except that one of the carrier webs consisted of an untreated PET film. After curing the treated PET carrier web was removed and a PSA tape was obtained.

EXAMPLE 17

PSA made with an opaque liner

Example 17 was made in the same manner as Example 7 except the transparent PET carrier webs were replaced by opaque PET carrier webs. The opaque carrier webs were treated with a silicone release coating to facilitate removal of the film. After curing, a free standing PSA film was formed.

EXAMPLE 18

Tackified tape

To 90 parts of syrup X was added 0.5 parts of initiator C and 0.05 parts of HDDA. 10 parts of KE 311 tackifier resin (available from Arakawa Chemical Co.) was then added to the syrup. The mixture was then knife coated at a thickness of 0.254 mm between two 0.091 mm thick polyester (PET) carrier webs. The carrier webs were treated with a silicone release agent to facilitate removal. The carrier webs were then drawn through a 80° C. water bath. The residence time in the water bath was 50 min. A free standing pressure sensitive adhesive film was formed. The adhesive was tested for peel adhesion, static shear and % conversion and the results are summarized in Table 9.

TABLE 9

| Example | % Residuals | Peel (N/dm) | Shear @ 70° C. (min) |
|---|---|---|---|
| 18 | 10 | 159 | 10,000+ |

This example showed that a thermal polymerization process was satisfactory for a formulation containing a tackifier which might be sensitive to UV or e-beam radiation.

EXAMPLE 19

Stacked PSA

A stacked PSA consisting of four PSA foam tapes was fabricated. The construction is shown in FIG. 3. The sample was coated using multiple knife coating heads such that each foam layer was separated by a carrier web. Four PSA layers were coated and cured at the same time. The formulations were the same as in examples 12 and 13 except that pigments were added to the layers for visual appeal. The mixtures were then knife coated at a thickness of 0.458 mm between 0.051 mm thick polyester (PET) carrier webs. The carrier webs were treated with a silicone release agent on both sides to facilitate removal of the foam PSAs. The carrier webs were then drawn through a 80° C. water bath. The residence time in the water bath was 8 min. Four free standing pressure sensitive adhesive foam tapes were formed. This illustrates the usefulness of the invention to produce stacked products. The benefit to this process is that more than one product can be produced at the same time. In addition multiple products are produced in the same amount of time as it takes to produce one product.

EXAMPLE 20
Different heat transfer medium, dual liner

This example was prepared exactly like Example 1 except that propylene glycol was used as the heat transfer medium instead of water in zone 1. A free standing pressure sensitive adhesive was obtained.

EXAMPLE 21–23
Heated platen

These examples were cured using heated platens as the thermal buffer. To 100 parts of syrup X was added 0.1 phr of hexanediol diacrylate (HDDA) and 0.2 phr of initiator A. The mixture was then knife coated at three different thicknesses between polyester (PET) carrier webs. The carrier webs were treated with a silicone release agent to facilitate removal. The carrier webs were then drawn between heated platens. The gap between the platens was 1 cm. Temperatures and residence times are summarized in Table 11. Free standing pressure sensitive adhesive films were formed. The adhesive films were monitored for percent conversion using $^1$H NMR spectroscopy and reported as acrylate residuals. The examples were also tested for peel strength and static shear to stainless steel. The results are summarized in Table 11.

TABLE 11

| Example | Thickness (mm) | Temp. (°C.) | Cure Time (min) | % Residuals | Peel (N/dm) | Shear @ 70° C. (min) |
| --- | --- | --- | --- | --- | --- | --- |
| 21 | 0.254 | 90 | 10 | <2 | 143 | 10,000+ |
| 22 | 0.127 | 89 | 5 | <2 | 74 | 10,000+ |
| 23 | 0.051 | 87 | 2.5 | <2 | 48 | 10,000+ |

These examples showed platens as a thermal buffer produced acceptable adhesives.

EXAMPLE 24–26
Impingement oven

PSA examples were cured using an impingement oven as the thermal buffer. To 100 parts of syrup X was added 0.1 phr of hexanediol diacrylate (HDDA) and 0.2 phr of initiator A. The mixture was then knife coated at three different thicknesses between polyester (PET) carrier webs. The carrier webs were treated with a silicone release agent to facilitate removal. The carrier webs were then drawn through an impingement oven. Temperatures and residence times are summarized in Table 12. Free standing pressure sensitive adhesive films were formed. The adhesive films were monitored for percent conversion using NMR spectroscopy. The examples were also tested for peel strength and static shear to stainless steel. The results are summarized in Table 12.

TABLE 12

| Example | Thickness (mm) | Temp °C. | Cure Time (min) | % Residuals | Peel (N/dm) | Shear @ 70° C. (min) |
| --- | --- | --- | --- | --- | --- | --- |
| 24 | 0.254 | 85 | 24 | 3 | 101 | 10,000+ |
| 25 | 0.127 | 85 | 24 | 2 | 90 | 10,000+ |
| 26 | 0.051 | 85 | 24 | 2 | 87 | 10,000+ |

These examples showed impinged air as a thermal buffer produced acceptable adhesives.

Comparative Example A

This sample was prepared as described in Example 24 except that the thermal buffer was a vented oven instead of an impingement oven. The sample was poorly cured and the % conversion was less than 85%. The sample could not be removed from the release liner and could not be tested as a PSA because of poor physical integrity. There is not sufficient heat transfer using a vented oven to achieve desirable properties. Use of the vented oven resulted in thermal runaway.

Comparative Example B
Esmay et. al.

Comparative example B was made according to the procedure in Esmay et al., Example 34. (U.S. Pat. No. 4,415,615). To 100 parts of syrup X was added 0.05 phr of HDDA and 1 phr of surfactant mixture. The surfactant mixture consisted of a 50/50 by volume mixture of FC-171 and FC-431 (both available from 3M Co.). To this mixture was added 0.15 phr initiator D. The sample was then frothed in a laboratory blender under a nitrogen atmosphere for one minute just prior to coating. The sample was coated at a thickness of 0.916 mm. and placed in a oven at 85° C. for 60 minutes. A frothed PSA material was obtained. The sample had only an 89.5 conversion. The sample could not be removed from the release liner and could not be tested. There is not sufficient heat transfer using a vented oven to achieve good conversions and desirable PSA properties.

EXAMPLE 27
Single Liner—H$_2$O

To 100 parts of syrup X was added 0.05 phr of hexanediol diacrylate (HDDA) and 0.2 phr of thermal initiator. The mixture was then knife coated at a thickness of 0.254 mm onto a single 0.051 mm thick polyester (PET) carrier web. The carrier web was treated with a silicone release agent to facilitate removal. The carrier web was then immersed in a 85° C. water bath, which was deoxygenated by bubbling N$_2$ through the water bath. The residence time in the water bath was 8 minutes. A free standing pressure sensitive adhesive film was formed. The adhesive film was monitored for percent conversion of monomer using weight loss experiments. The example was also tested for peel strength and static shear to stainless steel. The results are summarized in Table 13.

EXAMPLE 28
Single Liner—Fluorinert 77

To 100 parts of syrup X was added 0.05 phr of hexanediol diacrylate (HDDA) and 0.2 phr of thermal initiator. The mixture was then knife coated at a thickness of 0.254 mm onto a single 0.051 mm thick polyester (PET) carrier web. The carrier web was treated with a silicone release agent to facilitate removal. The carrier webs were then immersed in a 90° C. Fluorinert 77 (available from 3M Co.) bath, which was deoxygenated by bubbling N$_2$ through the bath. The residence time in the Fluorinert 77 bath was 8 minutes. A free standing pressure sensitive adhesive film was formed. The example was also tested for peel strength and static shear to stainless steel. The results are summarized in Table 13.

TABLE 13

| Example | Peel (N/dm) | Shear @ 70° C. (min) |
| --- | --- | --- |
| 27 | 50 | 10,000+ |
| 28 | 152 | 10,000+ |

Comparative Example C
Sekisui—JP 4-41576

A syrup was made by the same method as syrup X. An additional 0.1 parts of KB1 and 0.05 parts of 1,6-hexanediol diacrylate (HDDA) were then added. The mixture was then knife coated at a thickness of 0.127 mm onto a single silicone treated PET carrier web. The carrier web was then placed into a container of room temperature water at a water depth of 19 mm. The sample was irradiated under water with two fluorescent black light lamps (Sylvania F20T12BL) at a distance of 75 mm from the web. The web was irradiated for 10 minutes. The resulting PSA was then air dried. A free standing film with poor film properties was obtained. The film could only be removed from the carrier web after cooling with dry ice. The film was tested for peel adhesion, static shear and % residuals and the results are summarized in Table 14.

TABLE 14

| Example | % Residuals | Peel (N/dm) | Shear @ 70° C. (min) | Shear @ 20° C. (min) |
| --- | --- | --- | --- | --- |
| C | 3.1 | 25 | <1 | <1 |
| 27 | — | 50 | 10,000+ | — |

EXAMPLES 29–32
Results of Simulation

While not intending to be bound by theory, it is believed that the present invention can be described by referring to a series of simulations based on actual observations of the novel process of this application. Both auto-acceleration and deceleration effects that account for changes in diffusion limited kinetic parameters with conversion are included. Changes in these parameters with temperature were also accounted for. The initiator concentration was preselected to 0.2% by weight.

Referring to FIGS. 5(a) to 6(e), plots of conversion, temperature, initiator and initiator radical concentrations, polymer radical (live chain) concentrations, and number average molecular weight are shown. The number average molecular weight is a good indicator of average chain length. A summary of the results follow.

EXAMPLE 29
Forced Air Convection as a Thermal Buffer

Forced air was specified at 1500 m/min at 60° C. Lower air speeds or higher temperatures led to results that were of limited analytical utility due to the extremely rapid changes in all parameters.

For thermal polymerization with forced air, the temperature of the polymerizing mixture rises slowly from room temperature to the forced air temperature of 60° C. During this time, the rate of initiation is slow, and a small number of long chains form which are rarely terminated due to low concentrations of live chains. As the carrier web temperature slowly rises, due to insufficient heat transfer, the rate of initiation increases, increasing the rate of propagation (more live chains growing), which further drives the temperature up. A rapid rise in temperature takes place (here, an increase of 60° C. above the air temperature), creating large numbers of initiator radicals. The sudden drop in initiator concentration is approximately the same as the increase in polymer radicals, indicating that the initiator radicals are quickly converted to new live chains which in turn propagate and use up the remaining monomer. The high concentration of live chains leads to rapid termination, resulting in a large number of short polymer chains and a sharp drop in $M_n$. Initiator radicals continue to form and increase in their numbers since there is no monomer left to consume them. Eventually these would also terminate each other. The drop in $M_n$, and a less dramatic decrease in the weight-average molecular weight (not shown) gives rise to a distribution of long chains (created prior to the thermal peak) and a nearly equal population of very short chains for a high polydispersity. This in turn typically reduces shear strength in the final adhesive.

EXAMPLE 30
Convective Heat Transfer Using Water as a Thermal Buffer

Water conditions were specified as flowing water at 15 m/min (to simulate stirring) at a temperature of 85° C. Heat transfer accomplished by convection by the water flow, carried out at a much higher temperature that for the forced air convection used in Example 29, clearly shows only a mild increase in temperature of the polymerizing mixture during the most rapid portion of conversion. The initiator consumption is constant and initiator radicals only significantly increase in number after the monomer is completely consumed. Note that no apparent drop in $M_n$ or sudden rise in polymer radical concentration occurs during the small temperature rise. A gradual decline in $M_n$ results from the normal drop in the rate of propagation (auto-deceleration) as the polymer viscosity increases so that chains do not propagate as far before terminating, and in the decrease in monomer concentration (less material from which to grow). The apparent rise in polymer radicals similarly results from a decrease in termination rate.

EXAMPLES 31–32

Using the theoretical description of the present invention, a range for $R_{pmax}$ can be determined using low and high h values wherein isooctyl acrylate (monomer) and AIBN (initiator) are selected. The method used was to simulate a thermal polymerization for a given thickness of the polymerizable mixture, a given h and a given thermal buffer temperature and calculate the rate of polymerization, rate of initiation, temperature rise and $M_n$ (linear polymer simulation) as a function of time. The criterion for creating low molecular weight polymers was C<1, as used previously. (One can also observe an excessively rapid temperature rise and a run-away conversion of monomer as a function of time when C<1). The thermal buffer temperature was then varied until the reaction was considered to be well-controlled (C>1).

The first simulation runs were for 0.5 mm thick polymerizable mixture coatings. Static air ($h_{forced\ convection}=0$) and slow moving forced air convection ($h_{forced\ convection}=5.7$ W/(m².K)) at 1.1 m/sec were used as the heat transfer process in the thermal buffer. Using forced air at 1.1 m/sec and at a temperature of 35° C., the maximum temperature rise ($\Delta T$) was 19° C., with a maximum rate of polymerization of $7.4 \times 10^{-3}$ molar/sec, which results in a C value of 0.64. By reducing the air temperature to 32° C., the maximum temperature rise ($\Delta T$) was only 7° C. and C=1.3, with a maximum $R_p=2.5\times 10^{-3}$ molar/sec. Similar results were obtained using static air as the thermal buffer. Polymerizations in static air were calculated to take about 2 hours of reaction time to reach completion. Therefore, a practical lower limit to $R_{pmax}$ for a 0.5 mm thick film may be on the order of $5 \times 10^{-3}$ moles/liter.sec. For a much thinner coating of 0.05 mm, the effect of h will be less important, and for a given h, the reaction temperature can be higher while maintaining control (making $R_{pmax}$ higher). For a forced air convection flow of 1.1 m/s, the reaction using the 0.05 mm thick coating just met the criterion for C at an air temperature of 60° C. and an $R_{pmax}=3 \times 10^{-2}$ molar/sec. A practical lower limit to $R_{pmax}$ is therefore on the order of $1 \times 10^{-3}$ moles/liter.sec for this thickness.

To obtain upper limits to $R_{pmax}$, a high value of $h_{force\ convection}$ of 57 kW/m².K, which is the value for water flowing at 46 m/sec, was selected. The results were essentially equivalent to that obtained assuming h is infinite. All simulated reactions passed the criterion for C under these conditions (up to 200° C. limit) for AIBN (C values were >5 in all cases). The reactions reached completion (1% residuals) in about 1 to 3 seconds, but molecular weights were 1000 times less than the very slow reactions described above. $R_{pmax}$ values varied from 25 to 120 moles/liter.sec. A practical upper limit to $R_{pmax}$ is therefore on the order of 100 moles/liter.sec.

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

We claim:

1. A process for making an adhesive comprising allowing a carrier web coated with a thermally, free-radically polymerizable mixture, comprising at least one thermally, free-radically polymerizable monomer and at least one thermal initiator in a catalytically effective amount to remain in contact with a thermal buffer having a heat transfer coefficient of at least 25 W/(m².K) for a time sufficient to effect conversion of the coated mixture to an adhesive.

2. A process for thermal polymerization of a free-radically polymerizable adhesive composition comprising maintaining a carrier web coated with the free-radically polymerizable adhesive composition, comprising at least one thermally, free-radically polymerizable monomer and at least one thermal initiator in a catalytically effective amount at a temperature between ±20° C. of thermal buffer temperature by contacting the coated carrier web with the thermal buffer, the thermal buffer having a heat transfer coefficient of at least 25 W/(m².K).

3. The process according to claim 1 or claim 2 wherein the thermal buffer is water.

4. The process according to claim 1 or claim 2 wherein the thermal buffer is selected from the group consisting of propylene glycol, a mixture of water and propylene glycol, a perfluorinated hydrocarbon fluid, a buffered acidic mixture of inorganic salts in water, a buffered acidic mixture of organic salts in water, condensing steam, helium and hydrogen.

5. The process according to claim 1 or claim 2 wherein the thermally, free radically polymerizable mixture comprises at least one ester of acrylic acid and an alcohol having from 1 to 14 carbon atoms.

6. The process according to claim 1 or 2 wherein the thermally free-radically polymerizable mixture comprises at least one acrylic acid ester selected from the group consisting of methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate and dodecyl acrylate.

7. The process according to claim 1 or claim 2 wherein the heat transfer coefficient is at least 100 W/(m².K).

8. The process according to claim 1 or claim 2 wherein the heat transfer coefficient is at least 500 W/(m².K).

9. A process for making a pressure sensitive adhesive comprising the steps of:

(1) coating onto at least one major surface of a carrier web a substantially solvent-free thermally polymerizable mixture, wherein (a) the polymerizable mixture comprises at least one free-radically polymerizable monomer, and at least one thermal initiator in a catalytically effective amount, and (b) the viscosity of the polymerizable mixture is suitable for coating the carrier web;

(2) contacting the coated carrier web with a thermal buffer having a heat transfer coefficient of at least 25 W/(m².K), wherein the thermal buffer is maintained at a temperature, sufficient to initiate thermal polymerization of the polymerizable mixture;

(3) allowing the coated carrier web to remain in contact with the thermal buffer for a time sufficient to effect conversion of the polymerizable mixture to an adhesive; and (4) removing the coated carrier web from the thermal buffer.

10. The process according to claim 9, further comprising the step of excluding oxygen from contact with the thermally polymerizable mixture during step (2) and step (3).

11. The process according to claim 9, wherein the thermally free radically polymerizable mixture comprises at least one ester of acrylic acid and an alcohol having from 1 to 14 carbon atoms.

12. The process according to claim 9 wherein the thermally free-radically polymerizable mixture comprises at least one acrylic acid ester selected from the group consisting of methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate and dodecyl acrylate.

13. The process according to claim 9, further including at least one copolymerizable comonomer in the polymerizable mixture.

14. A process for making a pressure sensitive adhesive comprising the steps of:

(1) preparing at least one mixture comprising at least one thermal free-radically polymerizable monomer and at least one component of a thermal initiator;

(2) adjusting the viscosity of the mixture to a value suitable for coating;

(3) degassing the mixture;

(4) coating the degassed mixture onto a least one substrate;

(5) contacting the coated substrate with a thermal buffer having a heat transfer coefficient of at least 25 W/(m².K), wherein the thermal buffer is heated to a temperature sufficient to initiate thermal polymerization;

(6) allowing the coated substrate to remain in contact with the thermal buffer for a time sufficient to effect conversion of the mixture; and (7) removing the coated substrate from the thermal buffer.

15. A process for making a pressure sensitive adhesive comprising the steps of:
   (1) preparing at least one mixture comprising at least one thermal free-radically polymerizable monomer;
   (2) adjusting the viscosity of the mixture to a value suitable for coating;
   (3) admixing at least one component of a thermal initiator with the mixture;
   (4) degassing the mixture;
   (5) coating the degassed mixture onto a least one substrate;
   (6) contacting the coated substrate with a thermal buffer having a heat transfer coefficient of at least 25 $W/(m^2 \cdot K)$, wherein the thermal buffer is heated to a temperature sufficient to initiate thermal polymerization;
   (7) allowing the coated substrate to remain in contact with the thermal buffer for a time sufficient to effect conversion of the mixture; and
   (8) removing the coated substrate fom the thermal buffer.

16. A process for making a pressure sensitive adhesive comprising the steps of:
   (1) preparing at least one mixture comprising at least one thermal free-radically polymerizable monomer and at least one component of a thermal initiator;
   (2) adjusting the viscosity of the mixture to a value suitable for coating;
   (3) degassing the mixture;
   (4) coating the degassed mixture between a first and second substrate to form a sandwich;
   (5) contacting the sandwich with a thermal buffer having a heat transfer coefficient of at least 25 $W/(m^2 \cdot K)$, wherein the thermal buffer is heated to a temperature sufficient to initiate thermal polymerization;
   (6) allowing the sandwich to remain in contact with the thermal buffer for a time sufficient to effect conversion of the mixture; and
   (7) removing the sandwich from the thermal buffer.

17. A process for making a pressure sensitive adhesive comprising the steps of:
   (1) preparing at least one mixture comprising at least one thermal free-radically polymerizable monomer;
   (2) adjusting the viscosity of the mixture to a value suitable for coating;
   (3) admixing at least one component of a thermal initiator with the mixture;
   (4) degassing the mixture;
   (5) coating the degassed mixture between a first and second substrate to form a sandwich;
   (6) contacting the sandwich with a thermal buffer having a heat transfer coefficient of at least 25 $W/(m^2 \cdot K)$, wherein the thermal buffer is heated to a temperature sufficient to initiate thermal polymerization;
   (7) allowing the sandwich to remain in contact with the thermal buffer for a time sufficient to effect conversion of the mixture; and
   (8) removing the sandwich from the thermal buffer.

18. A process for making a pressure sensitive adhesive comprising the steps of:
   (1) preparing at least one mixture comprising at least one thermal free-radically polymerizable monomer and at least one component of a thermal initiator;
   (2) adjusting the viscosity of the mixture to a value suitable for coating;
   (3) degassing the mixture;
   (4) preparing a stacked article comprising the steps:
      (a) coating the degassed mixture between a first and second substrate to form layers of a sandwich;
      (b) repeating step (a), wherein the degassed mixture is coated between the second substrate and a sequentially adjacent substrate; and
      (c) continuing to repeat step (a) while adding additional substrates;
   (5) contacting the stacked article with a thermal buffer having a heat transfer coefficient of at least 25 $W/(m^2 \cdot K)$, wherein the thermal buffer is heated to a temperature, sufficient to initiate thermal polymerization;
   (6) allowing the stacked article to remain in contact with the thermal buffer for a time sufficient to effect conversion of the mixture of each layer; and
   (7) removing the stacked article from the thermal buffer.

19. The process according to claim 18 further including a final layer of the degassed mixture coated onto the topmost substrate prior to contacting the stacked article with the thermal buffer in step 5.

20. A process for making a pressure sensitive adhesive comprising the steps of:
   (1) preparing at least one mixture comprising at least one thermal free-radically polymerizable monomer;
   (2) adjusting the viscosity of the mixture to a value suitable for coating;
   (3) admixing at least one component of a thermal initiator into the mixture;
   (4) degassing the mixture;
   (5) preparing a stacked article comprising the steps:
      (a) coating the degassed mixture between a first and second substrate to form layers of a sandwich;
      (b) repeating step (a), wherein the degassed mixture is coated between the second substrate and a sequentially adjacent substrate; and
      (c) continuing to repeat step (a) while adding additional substrates;
   (6) contacting the stacked article with a thermal buffer having a heat transfer coefficient of at least 25 $W/(m^2 \cdot K)$, wherein the thermal buffer is heated to a temperature, sufficient to initiate thermal polymerization;
   (7) allowing the stacked article to remain in contact with the thermal buffer for a time sufficient to effect conversion of the mixture of each layer; and
   (8) removing the stacked article from the thermal buffer.

21. The process according to claim 20 further including a final layer of the degassed mixture coated onto the topmost substrate prior to contacting the stacked article with the thermal buffer in step 6.

22. The process according to any of claims 9, 14, 15, 16, 17, 18, or 20 wherein at least one coated layer is multi-layered.

23. A process for thermal polymerization of free-radically polymerizable composition comprising the step of maintaining the temperature between values $T_{min}$, and $T_{max}$ by thermal contact of the polymerizable composition with a heat exchange medium characterized by a minimum heat transfer coefficient $h_{min}$ wherein: $T_{max}=E_a/(R \ln(A/k_{dmax}))$ or the boiling point of the thermal transfer medium, whichever is greater, $T_{min}=E_a/(R \ln(A/k_{dmin}))$, $k_{dmax}=\{k_p[M]/$ $X_n k_t^{1/2}\}^2/[I]$, $k_{dmin}=k_t(R_{pmin}/k_p[M])^2/[I]$, $h_{min}=DR_{pmax} H_p/(T_{max}-T_{buf})$, $R_{pmax}=\{k_p[M]/k_t^{1/2}\}^2/X_n$, $E_a$ is a thermal initiator activation energy, R is the gas constant, A is the initiator prefactor, $k_t$ is the monomer termination rate constant, $k_p$ is the monomer propagation rate constant, $R_{pmin}$ is the minimum desired rate of polymerization, [M] is the monomer concentration, [I] is the initiator concentration, $T_{buf}$ is the temperature of the thermal buffer, $X_n$ is the desired average number of monomers per polymer chain, D is the thickness over which the temperature difference $T_{max}-T_{buf}$ exists, and $H_p$ is the heat of polymerization.

24. A process for thermal polymerization of free-radically polymerizable composition comprising the step of maintaining the temperature between values $T_{min}$ and $T_{max}$ by thermal contact of the polymerizable composition with a heat exchange medium characterized by a minimum heat transfer coefficient $h_{min}$ wherein: $T_{max}=E_a/(R \ln(A/k_{dmax}))$ or the boiling point of the thermal transfer medium, whichever is greater, $T_{min}=E_a/(R \ln(A/k_{dmin}))$, $k_{dmax}=\{R_{pmax}k_t^{1/2}/k_p[M]\}^2/[I]$, $k_{dmin}=k_t(R_{pmin}/k_p[M])^2/[I]$, $h_{min}=DR_{pmax}H_p/(T_{max}-T_{buf})$, $R_{pmax}$ is the maximum desired rate of polymerization, $R_{pmin}$ is the minimum desired rate of polymerization, $E_a$ is a thermal initiator activation energy, R is the gas constant, A is the initiator prefactor, $k_t$ is the monomer termination rate constant, $k_p$ is the monomer propagation rate constant, $R_{pmin}$ is the minimum desired rate of polymerization, [M] is the monomer concentration, [I] is the initiator concentration, $T_{buf}$ is the temperature of the thermal buffer, D is the thickness over which the temperature difference $T_{max}-T_{buf}$ exists, and $H_p$ is the heat of polymerization.

* * * * *